United States Patent [19]
Yoneyama

[11] Patent Number: 5,801,860
[45] Date of Patent: Sep. 1, 1998

[54] WAVELENGTH DIVISION MULTIPLEXING TRANSMISSION SYSTEM COMPRISING A FEEDBACK SECTION FOR TRANSMITTING A LIGHT POWER LEVEL SIGNAL FROM A LIGHT RECEIVER TO A LIGHT TRANSMITTER

[75] Inventor: Kenichi Yoneyama, Tokyo, Japan

[73] Assignee: NEC Corporation, Tokyo, Japan

[21] Appl. No.: 692,280

[22] Filed: Aug. 5, 1996

[30] Foreign Application Priority Data

Aug. 8, 1995 [JP] Japan ................. 7-202367

[51] Int. Cl.$^6$ ................. H04J 14/02
[52] U.S. Cl. ................. 359/124; 359/133; 359/187; 359/173
[58] Field of Search ................. 359/124, 126–127, 359/133, 152, 173, 177, 187, 188, 195

[56] References Cited

U.S. PATENT DOCUMENTS 5,225,922  7/1993  Chraplyvy et al. ................. 359/124

Primary Examiner—Kinfe-Michael Negash
Attorney, Agent, or Firm—Sughrue, Mion, Zinn, Macpeak & Seas, PLLC

[57] ABSTRACT

A wavelength division multiplexing transmission system includes a light transmitter (20, 20A), a light receiver (30), and an optical transmission path (40) for connecting the light transmitter and the light receiver. The wavelength division multiplexing transmission system also includes a feedback section (80) for connecting to the light receiver and the light transmitter. The light receiver has a power level detecting unit (36) which detects received light power levels of demultiplexed light signals to produce detected light power level signals. An encoding unit (37) encodes the detected light power level signals into an output light power level signal. The feedback section therefore transmits the output light power level signal as a transmission light power level signal from the light receiver to the light transmitter. The light transmitter includes a decoding circuit (27) for decoding the transmission light power level signal into input light power level signals as replicas of the detected light power level signals. A power control unit (24, 24A) is responsive to the input light power level signals to control light sources (22-1 to 22-m) to change controllable original light power levels of original light signals so that the demultiplexed light signals have the received light power levels each of which becomes a predetermined light power level.

19 Claims, 16 Drawing Sheets

WAVELENGTH DIVISION MULTIPLEXING TRANSMISSION SYSTEM COMPRISING A FEEDBACK SECTION FOR TRANSMITTING A LIGHT POWER LEVEL SIGNAL FROM A LIGHT RECEIVER TO A LIGHT TRANSMITTER

BACKGROUND OF THE INVENTION

This invention relates to a wavelength division multiplexing transmission system.

As is well known in the art, a wavelength division multiplexing transmission system comprises a light transmitter, a light receiver, and an optical transmission path for connecting the light transmitter and the light receiver. The optical transmission characteristics of the transmission path are dependent on wavelength in the manner which will later become clear.

The light transmitter has first through m-th input terminals which are supplied with first through m-th upward input data signals for first through m-th channels, where m represents a positive integer which is not less than two. The light transmitter sends a multiplexed light signal to the optical transmission path. The optical transmission path transmits the multiplexed light signal as a transmission light signal from the light transmitter to the light receiver. The light receiver receives the transmission light signal as a received light signal. The light receiver has first through m-th output terminals for outputting first through m-th output data signals as replicas of the first through the m-th input data signals, respectively.

The light transmitter comprises first through m-th upward light sources, an optical multiplexer, and a power control unit. Each of the first through m-th light sources may be a laser diode. Responsive to the first through the m-th input data signals, the first through the m-th light sources emit first through m-th original light signals with first through m-th controllable original light power levels, respectively, along a forward direction. The first through the m-th original light signals have first through m-th wavelengthes, respectively, which are different from each other. The first through the m-th light sources further emit first through m-th backward light signals, respectively, in a backward direction.

Connected to the first through the m-th light sources and an end of the optical transmission path, the optical multiplexer multiplexes the first through the m-th original light signals into the multiplexed light signal. The multiplexed light signal is sent to the end of the optical transmission path. The optical multiplexer may be a wavelength multiplexing coupler, a fiber coupler, or the like.

Inasmuch as the transmission characteristics of the optical transmission path are dependent on wavelength, the first through the m-th light sources is controlled by the power control unit. More specifically, the optical transmission path comprises generally an optical fiber, a plurality of optical amplifiers, or the like. As a result, the optical transmission path has a gain/loss characteristic which is different for each wavelength. The power control unit comprises first through m-th photo detectors and first through m-th output control circuits. Each of the first through the m-th photo detectors may be a photodiode.

Connected to the first through the m-th light sources, the first through the m-th photo detectors detect the first the m-th controllable original light power levels in the first through the m-th backward light signals to produce first through m-th detected light power level signals indicative of the first the m-th controllable original light power levels, respectively.

Connected to the first through the m-th photo detectors and to the first through the m-th light sources, the first through the m-th output control circuits are preliminarily set first through m-th upward output levels for the first through the m-th light sources with the characteristic of wavelength dependency in the optical transmission path taken into account. Responsive to the first through the m-th detected light power level signals, the first through the m-th output control circuits controls the first through the m-th light sources so as to maintain the first through the m-th output levels.

The light receiver comprises an optical demultiplexer and first through m-th light reception units. Connected to the other end of the optical transmission path, the optical demultiplexer demultiplexes the received light signal into first through m-th demultiplexed light signals, respectively. The first through the m-th demultiplexed light signals have first through m-th received light power levels, respectively. Connected to the optical demultiplexer in common and the first through the m-th output terminals, the first through the m-th light reception units receive the first through the upward demultiplexed light signals to convert the first through the m-th demultiplexed light signals into the the first through the m-th output data signals which are outputted by the first through the m-th output terminals, respectively.

In the above-mentioned conventional wavelength division multiplexing transmission system, it is assumed that a wavelength characteristic of the optical transmission path is fixed. However, the wavelength characteristic of the optical transmission path actually changes with time. As a result, degradation of signal-to-noise ratio occurs in the received light signal.

SUMMARY OF THE INVENTION

It is therefore an object of this invention to provide a wavelength division multiplexing transmission system which is capable of maintaining a plurality of received light power levels of demultiplexed light signals at a predetermined power level although a wavelength characteristic of an optical transmission path changes.

It is another object of this invention to provide a light receiver for use in the wavelength division multiplexing transmission system of the type described.

Other objects of this invention will become clear as the description proceeds.

On describing the gist of an aspect of this invention, it is possible to understand that a wavelength division multiplexing transmission system comprises a light transmitter, a light receiver, and an optical transmission path for connecting the light transmitter and the light receiver. The transmission characteristics of the optical transmission path are dependent on wavelength. The light transmitter comprises first through m-th light sources for emitting first through m-th original light signals with first through m-th controllable original light power levels, respectively, where m represents a positive integer which is not less than two. The first through m-th original light signals have first through m-th wavelengths which are different from each other. Connected to the first through the m-th transmitter light sources and an end of the optical transmission path, an optical multiplexer multiplexes the first through the m-th original light signals into a multiplexed light signal. The optical transmission path transmits the multiplexed light signal as a transmission light signal from the light transmitter to the light receiver. The light receiver receives the transmission light signal as a received light signal. The light receiver comprises an optical demultiplexer connected to the other end of the optical transmission path. The optical demultiplexer demultiplexes the received light signal into first through m-th demultiplexed light signals as replicas of the first through the m-th original light signals, respectively. The first through the m-th demultiplexed light signals have first through m-th received power light levels, respectively. Connected to the optical demultiplexer, first through m-th light reception units receives the first through the m-th demultiplexed light signals, respectively.

According to the above-mentioned aspect of this invention, the above-understood wavelength division multiplexing transmission system further comprises feedback means for connecting to the light receiver and the light transmitter. The light receiver further comprises power level detecting means connected to the optical demultiplexer. The power level detecting means detects the first through the m-th received light power levels of the first through the m-th demultiplexed light signals to produce first through m-th detected light power level signal indicative of the first through the m-th received light power levels. Connected to the power level detecting means and to an end of the feedback means, power level outputting means outputs, in response to the first through the m-th detected light power level signal, an output light power level signal corresponding to the first through the m-th detected light power level signal to the end of the feedback means. The feedback means therefore transmits the output light power level signal as a transmission light power level signal from the light receiver from the light transmitter. The light transmitter further comprises power level inputting means connected to the other end of the feedback means. The power level inputting means inputs the transmission light power level signal from the feedback means to produce first though m-th input light power level signals as replicas of the first through the m-th detected light power level signals, respectively. Connected to the power level inputting means and the first through the m-th transmitter light sources, power control means controlling, in response to the first through the m-th input light power level signals, the first through the m-th light sources to change the first through the m-th controllable original light power levels of the first through the m-th original light signals so that the first through the m-th demultiplexed light signals have the first through the m-th received light power levels each of which becomes a predetermined light power level.

DESCRIPTION OF THE PREFERRED EMBODIMENTS

Figure 1:
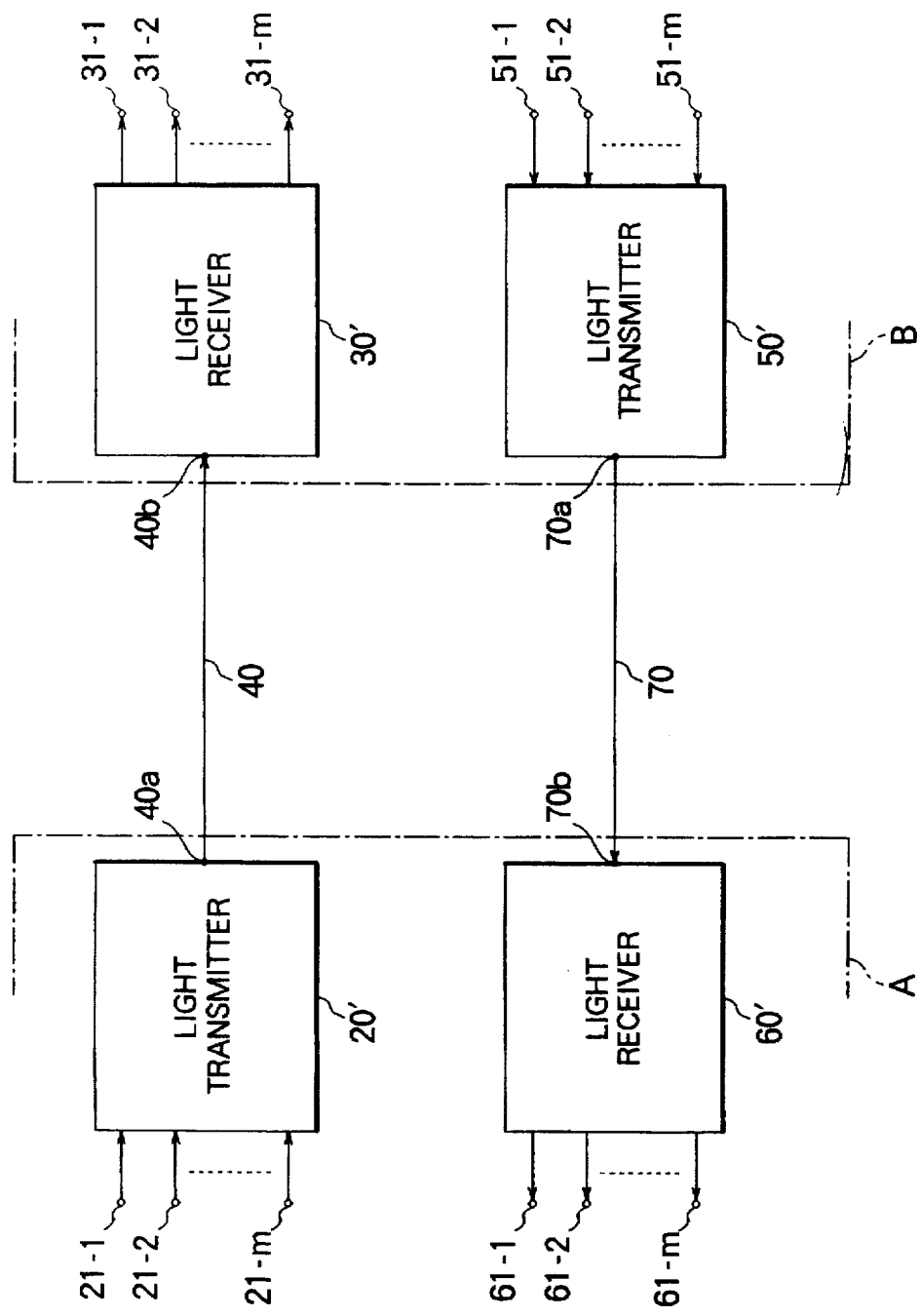
FIG. 1 is a block diagram of a conventional wavelength division multiplexing transmission system.

Referring to FIG. 1, description will be made for a better understanding of this invention as regards a conventional wavelength division multiplexing transmission system. In FIG. 1, the illustrated wavelength division multiplexing transmission system comprises a light transmitter 20' of a first side A, a light receiver 30' of a second side B opposite to the first side A, and an optical transmission path 40 for connecting the light transmitter 30' of the first side A and the light receiver 30' of the second side B. The transmission characteristics of the optical transmission path 40 are dependent on wavelength in the manner which will later become clear. The optical transmission path 40 may be called an upward optical transmission path. As a result, the light transmitter 20' of the first side A and the light receiver 30' of the second side B may be called an upward light transmitter and an upward light receiver, respectively.

In the example being illustrated, the wavelength division multiplexing transmission system further comprises another light transmitter 50' of the second side B, another light receiver 60' of the first side A, and another optical transmission path 70 for connecting the light transmitter 50' of the second side B and the light receiver 60' of the first side A. The transmission characteristics of the optical transmission path 70 are dependent on wavelength. The optical transmission path 70 may be called a downward optical transmission path. As a result, the light transmitter 50' of the second side B and the light receiver 60' of the first side A may be called a downward light transmitter and a downward light receiver, respectively.

The upward light transmitter 20' has first through m-th upward input terminals 21-1, 21-72, . . . , and 21-m which are supplied with first through m-th upward input data signals for first through m-th channels #1, #2, . . . , #m, where m represents a positive integer which is not less than two. The upward light transmitter 20' sends an upward multiplexed light signal to an end 40a of the upward optical transmission path 40. The upward optical transmission path 40 transmits the upward multiplexed light signal as an upward transmission light signal from the upward light transmitter 20' to the upward light receiver 30'. The upward light receiver 30' receives the upward transmission light signal as an upward received light signal at the other end 40b of the upward optical transmission path 40. The upward light receiver 30' has first through m-th upward output terminals 31-1, 31-2, . . . , and 31-m for outputting first through m-th upward output data signals as replicas of the first through m-th upward input data signals, respectively.

Likewise, the downward light transmitter 50' has first through m-th downward input terminals 51-1, 51-2, . . . , and 51-m which are supplied with first through m-th downward input data signals for the first through the m-th channels #1, #2, . . . , #m. The downward light transmitter 50' sends a downward multiplexed light signal to an end 70a of the downward optical transmission path 70. The downward optical transmission path 70 transmits the downward multiplexed light signal as a downward transmission light signal from the downward light transmitter 50' to the downward light receiver 60'. The downward light receiver 30' receives the downward transmission light signal as a downward received light signal at the other end 70b of the downward optical transmission path 70. The downward light receiver 60' has first through m-th downward output terminals 61-1, 61-2, . . . , and 61-m for outputting first through m-th downward output data signals as replicas of the first through m-th downward input data signals, respectively.

The downward light transmitter 50' is similar in structure to the upward light transmitter 20'. The downward light receiver 60' is similar in structure to the upward light receiver 30'. As shown in FIG. 1, the upward light transmitter 20' and the downward light receiver 60' operate independently to one another in the first side A. In addition, the downward light transmitter 50' and the upward light receiver 30' operate independently to one another in the second side B.

Figure 2:
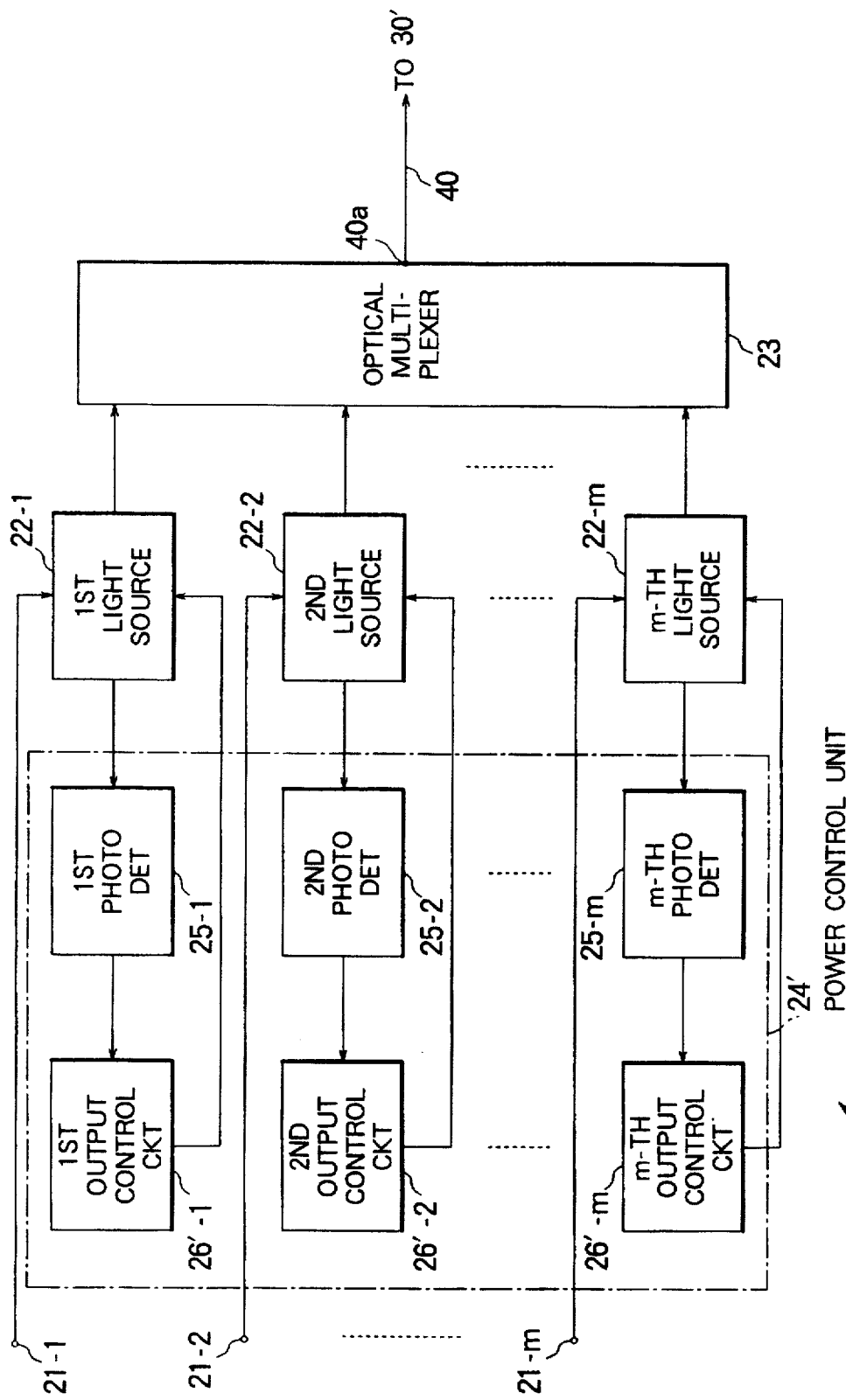
FIG. 2 is a block diagram of a conventional light transmitter for use in the wavelength division multiplexing transmission system illustrated in FIG. 1.

Turning to FIG. 2, the upward light transmitter 20' comprises first through m-th upward light sources 22-1, 22-2, . . . , and 22-m, an upward optical multiplexer 23, and an upward power control unit 24'. The first through m-th upward light sources 22-1 to 22-m are connected to the first through the m-th upward input terminals 21-1 to 21-m, respectively. Each of the first through m-th upward light sources 22-1 to 22-m may be a laser diode. Responsive to the first through the m-th upward input data signals, the first through the m-th upward light sources 22-1 to 22-m emit first through m-th upward original light signals with first through m-th upward controllable original light power levels, respectively, along a forward direction which is a right-hand direction in FIG. 2. The first through the m-th upward original light signals have first through m-th wavelengthes $\lambda_1$, $\lambda_2$, and $\lambda_m$, respectively, which are different from each other. The first through the m-th upward original light signals are supplied to the upward optical multiplexer 23. The first through the m-th upward light sources 22-1 to 22-m further emit first through m-th backward light signals, respectively, in a backward direction which is a left-hand direction in FIG. 2. The first through the m-th backward light signals are supplied to the upward power control unit 24'.

The upward optical multiplexer 23 is connected to the first through the m-th upward light sources 22-1 to 22-m and to the end 40a of the upward optical transmission path 40. The upward optical multiplexer 23 may be a wavelength multiplexing coupler, a fiber coupler, or the like. The upward optical multiplexer 23 multiplexes the first through the m-th upward original light signals into the upward multiplexed light signal. The upward multiplexed light signal is sent to the end 40a of the upward optical transmission path 40.

Inasmuch as the transmission characteristics of the upward optical transmission path 40 are dependent on wavelength, the first through the m-th upward light sources 22-1 to 22-m is controlled by the upward power control unit 24'. More specifically, the upward optical transmission path 40 comprises generally an optical fiber, a plurality of optical amplifiers, or the like. As a result, the upward optical transmission path 40 has a gain/loss characteristic which is different for each wavelength.

The upward power control unit 24' comprises first through m-th upward photo detectors 25-1, 25-2, . . . , and 25-m and first through m-th upward output control circuits 26'-1, 26'-2, . . . , and 26'-m.

The first through the m-th upward photo detectors 25-1 to 25-m are connected to the first through the m-th upward light sources 22-1 to 22-m, respectively. Each of the first through the m-th upward photo detectors 25-1 to 25-m may be a photodiode. The first through the m-th upward photo detectors 25-1 to 25-m detects the first through the m-th upward controllable original light power levels in the first through the m-th backward light signals to produce first through m-th upward detected light power level signals indicative of the first through the m-th upward controllable original light power levels, respectively. The first through the m-th upward detected light power level signals are supplied to the first through the m-th upward output control circuits 26'-1 to 26'-m, respectively.

The first through the m-th upward output control circuits 26'-1 to 26'-m are connected to the first through the m-th upward photo detectors 25-1 to 25-m and to the first through the m-th upward light sources 22-1 to 22-m, respectively. The first through the m-th upward output control circuits 26'-1 to 26'-m are preliminarily set first through m-th upward output levels for the first through the m-th upward light sources 22-1 to 22-m with the wavelength dependent characteristics in the upward optical transmission path 40 taken into account. Responsive to the first through the m-th upward detected light power level signals, the first through the m-th upward output control circuits 26'-1 to 26'-m control the first through the m-th upward light sources 22-1 to 22-m so as to maintain the first through the m-th upward controllable original light power levels at the first through the m-th upward output levels, respectively.

Figure 3:
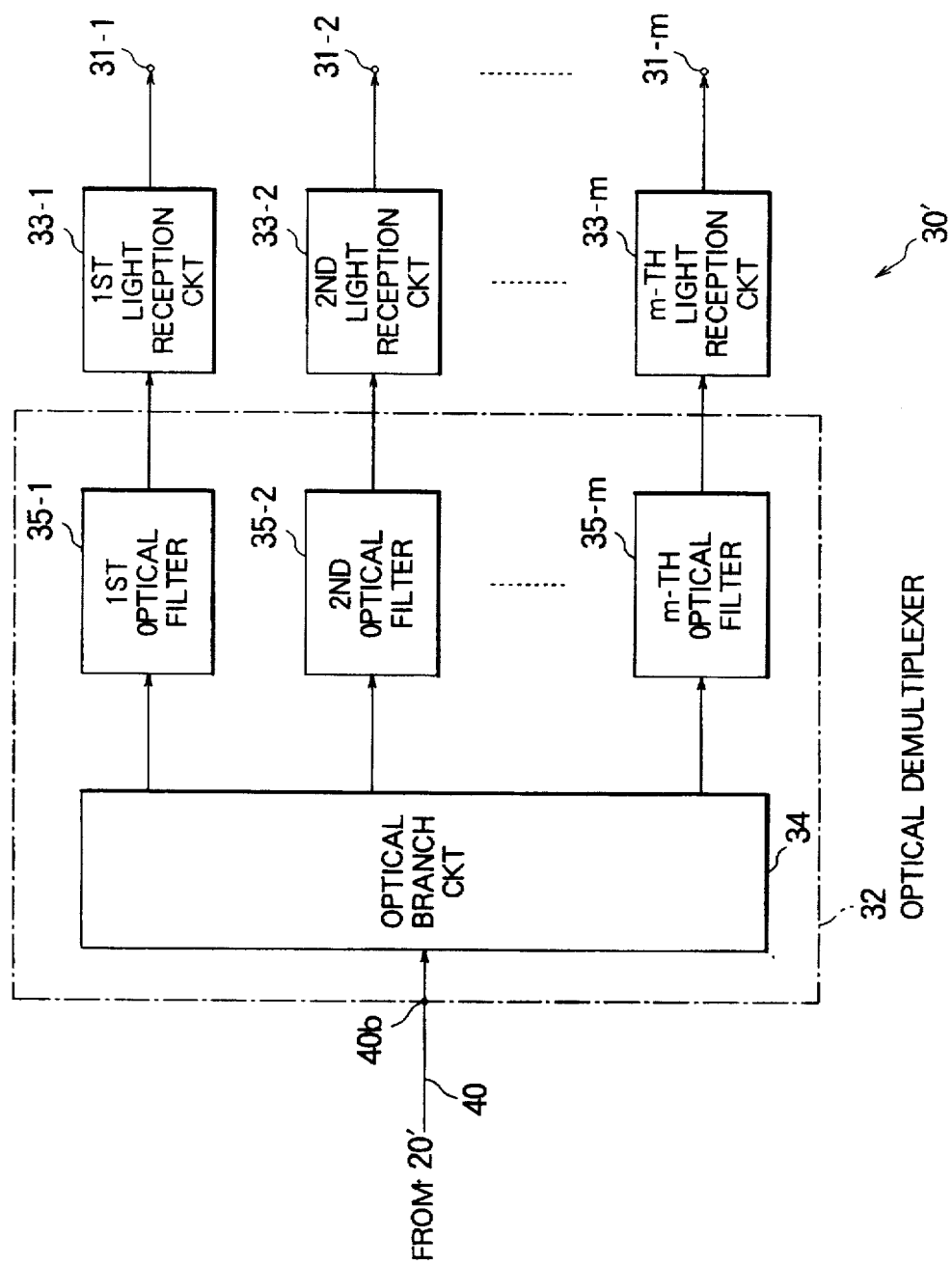
FIG. 3 is a block diagram of a conventional light receiver for use in the wavelength division multiplexing transmission system illustrated in FIG. 1.

Turning to FIG. 3, the upward light receiver 30' comprises an upward optical demultiplexer 32 and first through m-th upward light reception units 33-1, 33-2, . . . , and 33-m. The upward optical demultiplexer 32 is connected to the other end 40b of the upward optical transmission path 40. The upward optical demultiplexer 32 demultiplexes the upward received light signal into first through m-th upward demultiplexed light signals. The first through the m-th demultiplexed upward light signals have first through m-th upward received light power levels, respectively. The first through the m-th upward demultiplexed light signals are supplied to the first through the m-th upward light reception units 33-1 to 33-m, respectively.

In the example being illustrated, the upward optical demultiplexer 32 comprises an upward optical branch circuit 34 and first through m-th upward optical filters 35-1, 35-2, . . . , and 35-m. The upward optical branch circuit 34 branches the upward received light signal into first through m-th upward received branch light signals. The first through the m-th upward received branch light signals are supplied to the first through the m-th upward optical filters 35-1 to 35-m, respectively. The first through the m-th upward optical filters 35-1 to 35-m have first through m-th filtering characteristics for passing through the first through the m-th wavelengthes $\lambda_1$ to $\lambda_m$, respectively. The first through the m-th upward optical filters 35-1 to 35-m carry out filtering operation on the first through the m-th upward received branch light signals to produce the first through the m-th upward demultiplexed light signals, respectively.

The upward optical branch circuit 34 may be a wavelength multiplexing coupler, a fiber coupler, or the like. When the wavelength multiplexing coupler is used as the upward optical branch circuit 34, the first through the m-th upward optical filters 35-1 to 35-m may be omitted. This is because the wavelength multiplexing coupler carries out wavelength selection operation.

The first through the m-th upward light reception units 33-1 to 33-m are connected to the first through the m-th upward optical filters 35-1 to 35-m and to the first through the m-th upward output terminals 31-1 to 31-m, respectively. Each of the first through the m-th upward light reception units 33-1 to 33-m may be a photodiode. The first through the m-th upward light reception units 33-1 to 33-m receive the first through the m-th upward demultiplexed light signals to convert the first through the m-th upward demultiplexed light signals into the first through the m-th upward output data signals which are outputted by the first through the m-th upward output terminals 31-1 to 31-m, respectively.

Referring to FIG. 4 in addition to FIGS. 1 through 3, the description will proceed to operation of light power level control in the conventional wavelength division multiplexing transmission system. In FIG. 4, a first or top line indicates the upward multiplexed light signal of the upward light transmitter 20' (an output of the upward light transmitter 20'), a second line from the top indicates the wavelength characteristic of the upward optical transmission path 40, and a third line from the top indicates the upward received light signal of the upward light receiver 30' (an input of the upward light receiver 30'). It is assumed that the positive integer m is equal to four. In this event, the upward multiplexed light signal comprises first through fourth upward multiplexed wavelength components for the first through the fourth wavelengthes $\lambda_1$, $\lambda_2$, $\lambda_3$, and $\lambda_4$ that have the first through the fourth upward controllable original light power levels, respectively. In addition, the upward received light signal comprises first through fourth upward received wavelength components for the first through the fourth wavelengthes $\lambda_1$ to $\lambda_4$.

Description will first be made as regards operation in a case where the light power level control is not carried out. In this event, as shown in the first line of FIG. 4(A), the first through the fourth upward multiplexed wavelength components in the upward multiplexed light signal have the same original light power levels. Under the circumstances, as shown in the third line of FIG. 4(A), the first through fourth upward received wavelength components of the upward received light signal have different received light power levels due to the wavelength characteristic of the upward optical transmission path 40 that has larger loss in the first and the fourth wavelengths $\lambda_1$ and $\lambda_4$ in comparison with the second and the third wavelengths $\lambda_2$ and $\lambda_3$ as shown in the second line of FIG. 4(A). As a result, the first and the fourth upward received wavelength components of the upward received light signal have lower received light power levels than those of the second and the third upward received wavelength components of the upward received light signal and therefore have insufficient signal-to-noise ratio (S/N).

Description will be made as regards operation in a case where the light power level control by the conventional wavelength division multiplexing transmission system is carried out. It is assumed that the wavelength characteristic of the upward optical transmission path 40 is fixed and has larger loss in the first and the fourth wavelengths $\lambda_1$ and $\lambda_4$ as shown in the second line of FIG. 4(B). In this event, the upward light transmitter 20' transmits the upward multiplexed light signal where the first and the fourth upward multiplexed wavelength components have higher original light power levels than those of the second and the third upward multiplexed wavelength components as shown in the first line of FIG. 4(B). Under the circumstances, the upward light receiver 30' receives the upward received light signal having the first through the fourth received wavelength components which have the same received light power levels as shown in the third line of FIG. 4(B).

However, the wavelength characteristic of the upward optical transmission path 40 actually changes with time. This is because the optical amplifiers and the optical fiber composing the upward optical transmission path 40 have wavelength characteristics (wavelength dependency in gain/loss) which change in time with due to a change in environment.

Figures 4A, 4B, 4C, 4D:
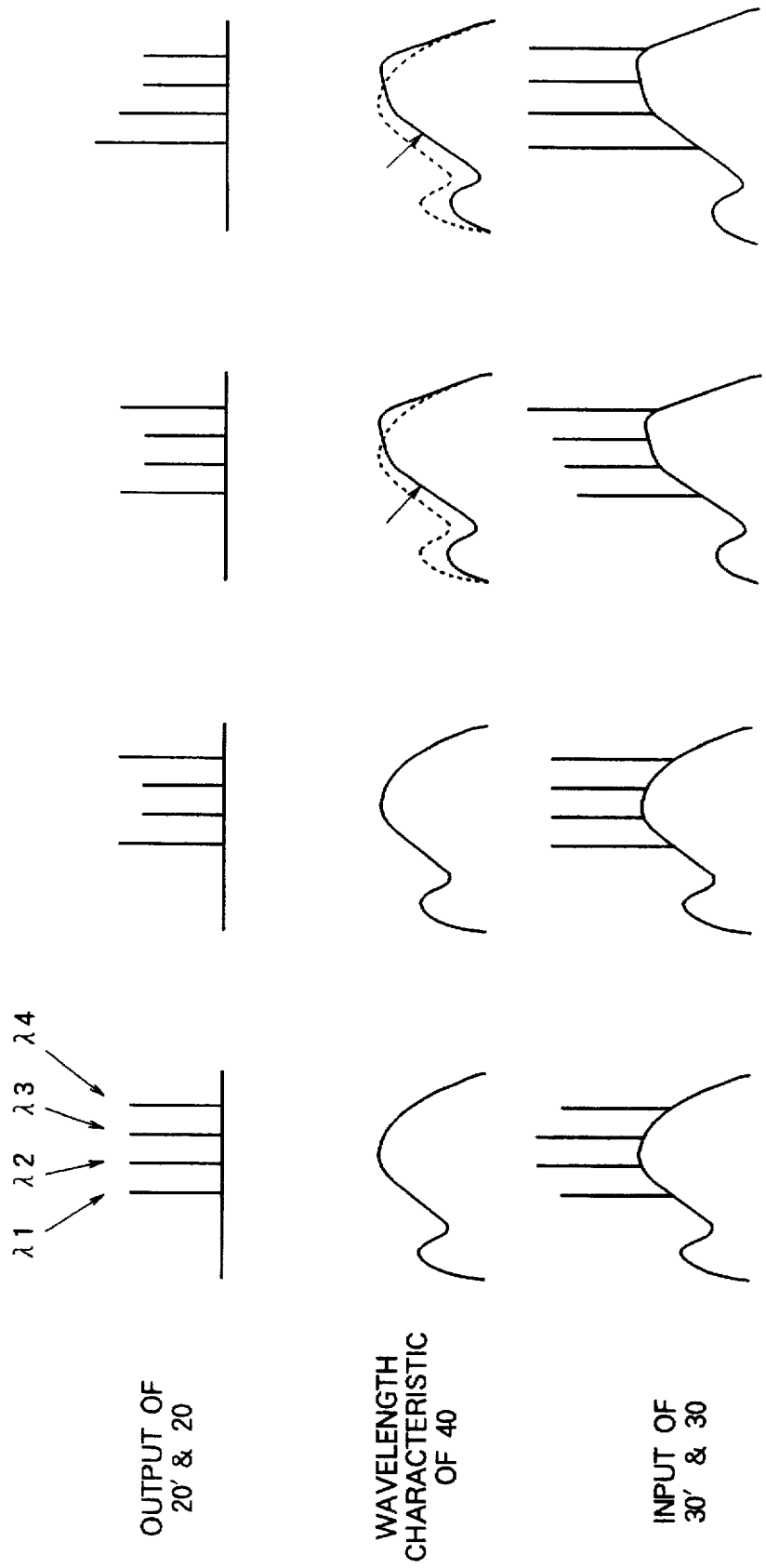
FIG. 4 shows wave forms for use in describing operation of the conventional wavelength division multiplexing transmission system and of a wavelength division multiplexing transmission system according to this invention.

For example, it is assumed, as shown in the second line of FIG. 4(C), that the wavelength characteristic of the upward optical transmission path 40 changes from a dotted line to a solid line along a direction depicted by arrow and has a larger loss in the first wavelengths $\lambda_1$. In this event, the upward light receiver 30' receives the upward received light signal where the first upward wavelength component has a lower received light power level than those of the second through the fourth upward received wavelength components as shown in the third line of FIG. 4(C). As a result, degradation of the signal-to-noise ratio occurs in the first upward wavelength component of the upward received light signal, as mentioned in the preamble of the instant specification.

Figure 5:
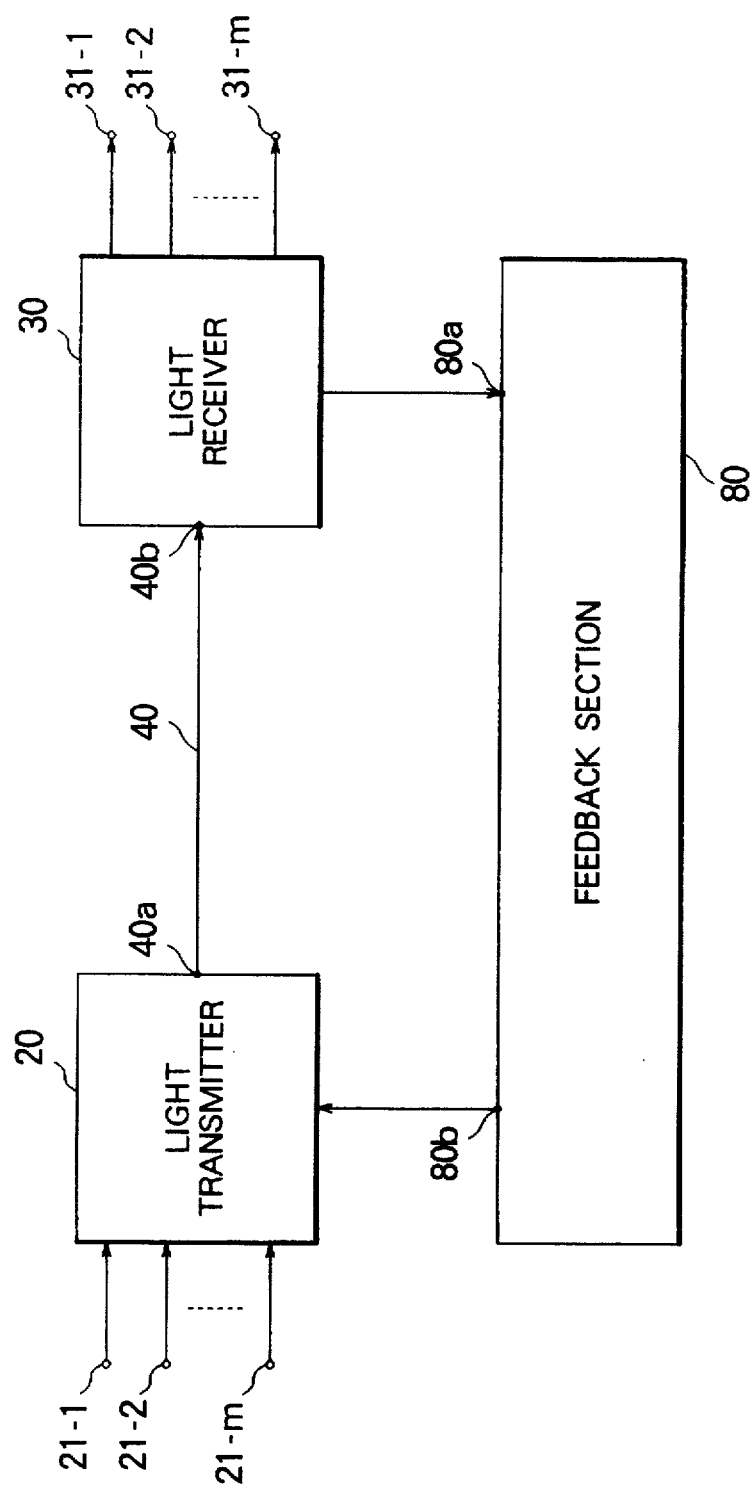
FIG. 5 is a block diagram of a wavelength division multiplexing transmission system according to an embodiment of this invention.

Referring to FIG. 5, the description will proceed to a wavelength division multiplexing transmission system according to an embodiment of this invention. The illustrated wavelength division multiplexing transmission system comprises an upward light transmitter 20, an upward light receiver 30, an upward optical transmission path 40 connecting the upward light transmitter 20 and the upward light receiver 30, and a feedback section 80 for connecting the upward light receiver 30 and the upward light transmitter 20.

Figure 6:
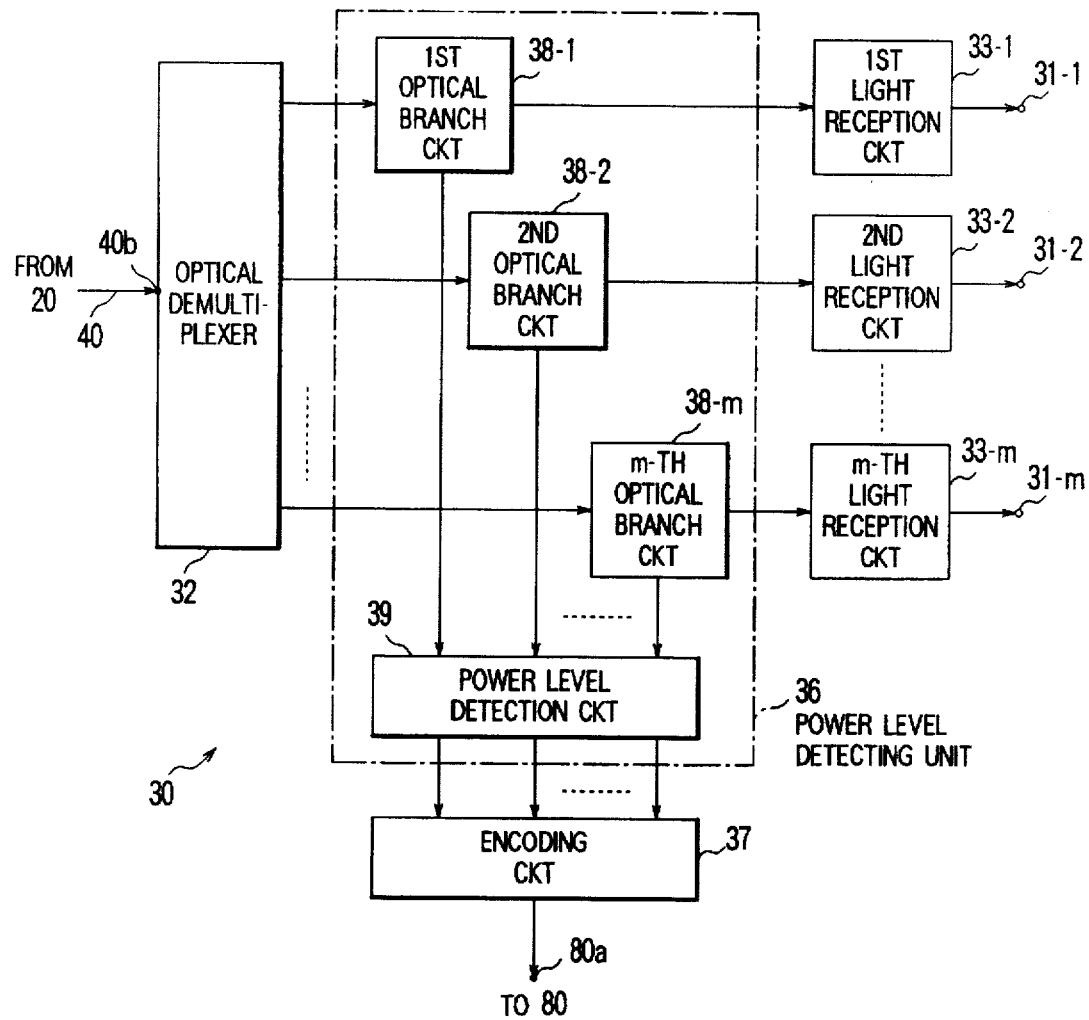
FIG. 6 is a block diagram of a light receiver for use in the wavelength division multiplexing transmission system illustrated in FIG. 5.

Turning to FIG. 6, the upward light receiver 30 comprises the upward optical demultiplexer 32, the first through the m-th upward light reception units 33-1 to 33-m, an upward power level detecting unit 36, and an upward encoding circuit 37.

The upward optical demultiplexer 32 is connected to the other end 40b of the upward optical transmission path 40. The upward optical demultiplexer 32 demultiplexes the upward received light signal into the first through the m-th upward demultiplexed light signals which have the first through the m-th upward received light power levels, respectively. The first through the m-th upward demultiplexed signals are supplied to the upward power level detecting unit 36.

The upward power level detecting unit 36 is connected to the upward optical demultiplexer 32. The upward power level detecting unit 36 detects the first through the m-th upward received light levels of the first through the m-th upward demultiplexed light signals to produce first through m-th upward detected light power level signals indicative of the first through the m-th upward received light power levels, respectively. More specifically, the upward power level detecting unit 36 comprises first through m-th upward optical branch circuits 38-1, 38-2, . . . , and 38-m and an upward power level detection circuit 39. The first through the m-th upward optical branch circuits 38-1 to 38-m are connected to the upward optical demultiplexer 32 in common and to the first through the m-th upward light reception units 33-1 to 33-m, respectively. The first through the m-th upward optical branch circuits 38-1 to 38-m branches the first through the m-th upward demultiplexed light signals to produce first through m-th upward branched light signals, respectively. The first through m-th upward branched light signals are supplied to the upward power level detection circuit 39. The upward power level detection circuit 39 is connected to the first through the m-th upward optical branch circuits 38-1 to 38-m and to the upward encoding circuit 37. The upward power level detection circuit 39 detects the first through the m-th upward received light power levels in the first through the m-th upward branched light signals to produce the first through the m-th upward detected light power level signals.

The upward encoding circuit 37 is connected to the upward power level detecting unit 36 and to an end 80a of the feedback section 80 (FIG. 5). The upward encoding circuit 37 encodes the first through the m-th upward detected light power level signals into an upward encoded light power level signal. At any rate, the upward encoding circuit 37 serves as an upward power level outputting arrangement for outputting, in response to the first through the m-th upward detected light power level signals, an upward output light power level signal corresponding to the first through the m-th upward detected light power level signals to the feedback section 80. The upward encoding circuit 37 produces the upward encoded light power level signal as the upward output light power level signal. As a result, the feedback section 80 transmits the upward output light power level signal as a downward transmission light power level signal from the upward light receiver 30 to the upward light transmitter 20 (FIG. 5).

Figure 7:
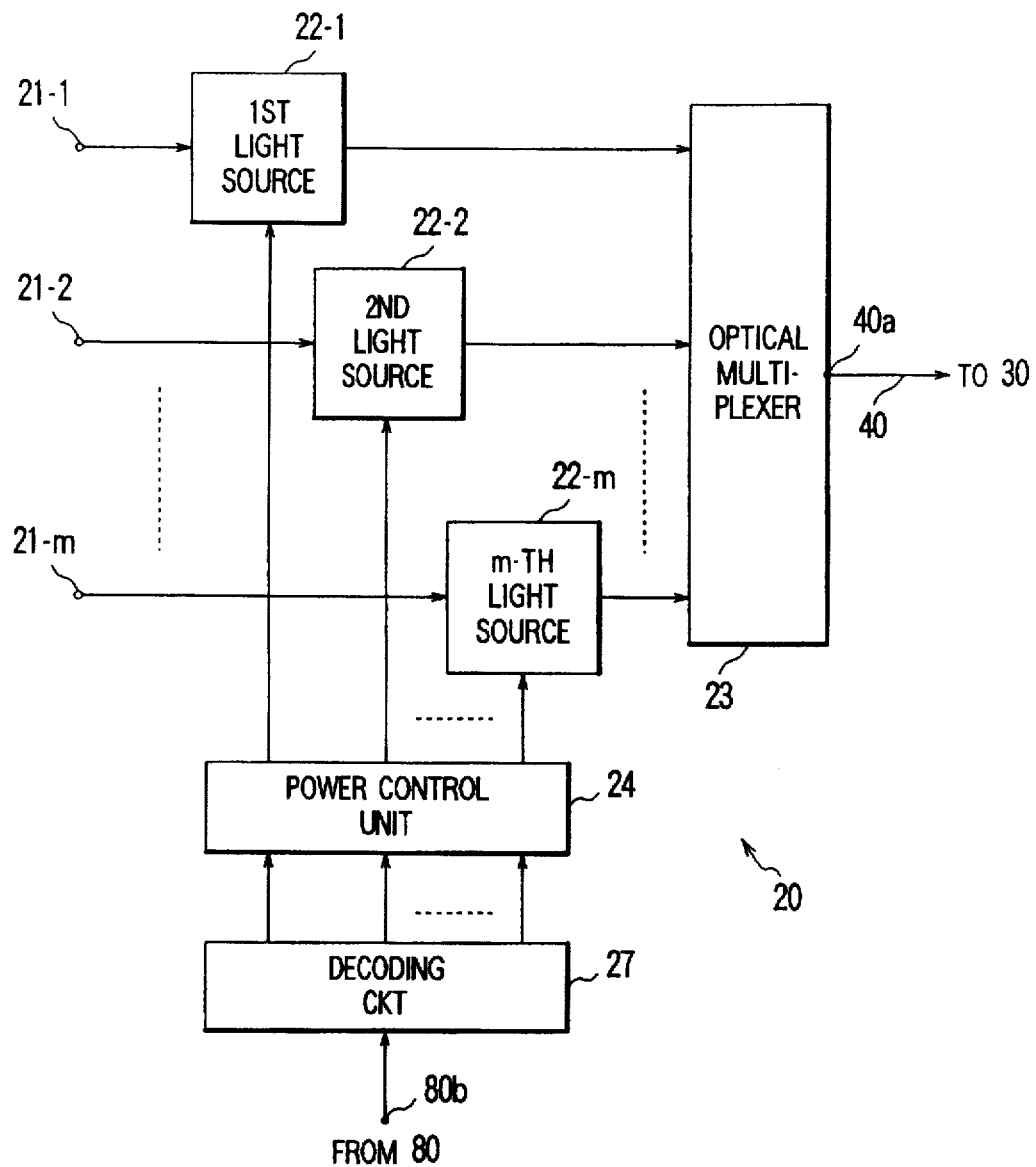
FIG. 7 is a block diagram of a light transmitter for use in the wavelength division multiplexing transmission system illustrated in FIG. 5.

Referring to FIG. 7, the upward light transmitter 20 comprises the first through the m-th upward light sources 22-1 to 22-m, the upward optical multiplexer 23, an upward power control unit 24, and an upward decoding circuit 27.

The first through the m-th upward light sources 22-1 to 22-m are supplied with the m-th upward input data signals from the first through the m-th upward input terminals 21-1 to 21-m, respectively. Responsive to the first through the m-th upward input data signals, the first through the m-th upward light sources 22-1 to 22-m emit the first through the m-th upward original light signals with the first through the m-th upward controllable original light power levels, respectively. The first through the m-th upward original light signals have the first through the m-th wavelengths $\lambda_1$ to $\lambda_m$, respectively. The first through the m-th upward original light signals are supplied to the upward optical multiplexer 23. The upward optical multiplexer 23 multiplexes the first through the m-th upward original light signals into the upward multiplexed light signal.

The upward decoding circuit 27 is connected to the other end 80b of the feedback section 80 (FIG. 5). The upward decoding circuit 27 acts as an upward power level inputting arrangement for inputting the downward transmission light power level signal from the feedback section 80 as an upward received light power level signal to produce first through m-th upward input light power level signals as replicas of the the first through the m-th upward detected light power level signals. In other words, the upward decoding circuit 27 decodes the upward received light power level signal into first through m-th upward decoded light power level signals. The upward decoding circuit 27 produces the first through m-th upward decoded light power level signals as the first through m-th upward input light power level signals. The first through m-th upward input light power level signals are supplied to the upward power control unit 24.

The upward power control unit 24 is connected to the upward decoding circuit 27 and to the first through the m-th upward light sources 22-1 to 22-m. Responsive to the first through m-th upward input light power level signals, the upward power control unit 24 controls the first through the m-th upward light sources 22-1 to 22-m to change the first through the m-th upward controllable original light power levels of the first through the m-th upward original light signals so that the first through the m-th upward demultiplexed light signals have the first through the m-th upward received light power levels each of which becomes a predetermined light power level.

Referring to FIGS. 4(C) and 4(D) in addition to FIGS. 5 to 7, the description will proceed to operation of light power level control in the wavelength division multiplexing transmission system according to this invention. It is assumed that the positive integer m is equal to four and that the wavelength characteristic of the upward optical transmission path 40 changes the dotted line to the solid line along the direction depicted by the arrow as shown in the second line of FIG. 4(C). In this event, the upward light receiver 30 receives the upward received light signal where the first upward wavelength component has the lower received light power level than those of the second through the fourth upward received wavelength components as shown in the third line of FIG. 4(C).

In the upward light receiver 30, the power level detecting unit 36 detects the first through the fourth upward received light power levels of the first through the fourth upward demultiplexed light signals which correspond to the first through the fourth upward received wavelength components. The power level detecting unit 36 produces the first through the fourth upward detected light power level signals indicative of the first through the fourth upward received light power levels, respectively. Connected to the power level detecting unit 36, the upward encoding circuit 37 encodes the first through the fourth upward detected light power level signals into the upward encoded light power level signal. The upward encoding circuit 37 produces the upward encoded light power level signal as the upward output light power level signal. The feedback section 80 transmits the upward output light power level signal as the downward transmission light power level signal from the upward light receiver 30 to the upward light transmitter 20.

In the upward light transmitter 20, the upward decoding circuit 27 inputs the downward transmission light power level signal as the upward received light power level signal to decode the upward received light power level signal into the first through the fourth upward decoded light power level signals as replicas of the first through the fourth upward detected light power level signals. The upward decoding circuit 27 produces the first through the fourth upward decoded light power level signals as the first through the fourth upward input power level signals. Connected to the upward decoding circuit 27, the upward power control unit 24 controls, in response to the first through the fourth upward input light power level signals, the first through the fourth upward light sources 22-1 to 22-4 to change the first through the fourth upward controllable original light power levels of the first through the fourth upward original light signals as shown in the first line of FIG. 4(D), so that the first through the fourth upward demultiplexed light signals have the first through the fourth upward received light power levels each of which becomes the predetermined light power level as shown in the third line of FIG. 4(D).

Figure 8:
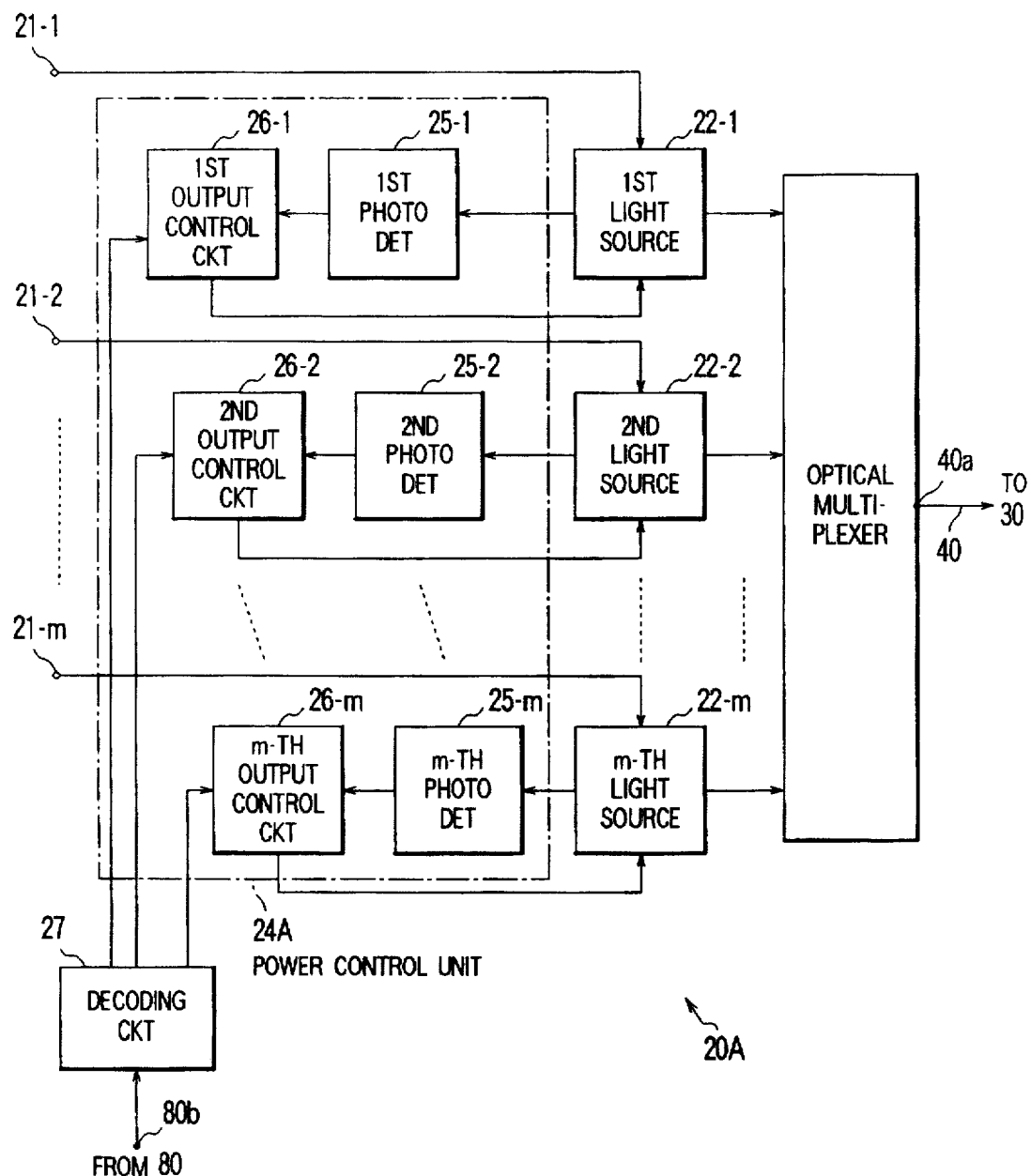
FIG. 8 is a block diagram of another light transmitter for use in the wavelength division multiplexing transmission system illustrated in FIG. 5.

Referring to FIG. 8, another upward light transmitter 20A is similar in structure to that illustrated in FIG. 7 except that the upward power control unit is modified to be different from that described in conjunction with FIG. 7 as will become clear. The upward power control unit is therefore depicted at 24A.

The upward power control unit 24A is similar in structure to the upward power control unit 24' illustrated in FIG. 2 except that the first through the m-th upward output control circuits are modified to be different from those described in conjunction with FIG. 2 as will later become clear. The first through the m-th upward output control circuits are therefore depicted at 26-1, 26-2, . . . , and 26-m.

The first through the m-th upward output control circuits 26-1 to 26-m are supplied not only with the first through the m-th upward detected light power level signals but also with the first through the m-th upward input light power level signals, respectively. Responsive to the first through the m-th upward detected light power level signals, the first through the m-th upward output control circuits 26-1 to 26-m control the first through the m-th upward light sources 22-1 to 22-m so that each of the first through the m-th upward input light power level signals has the predetermined light power level.

Figure 9:
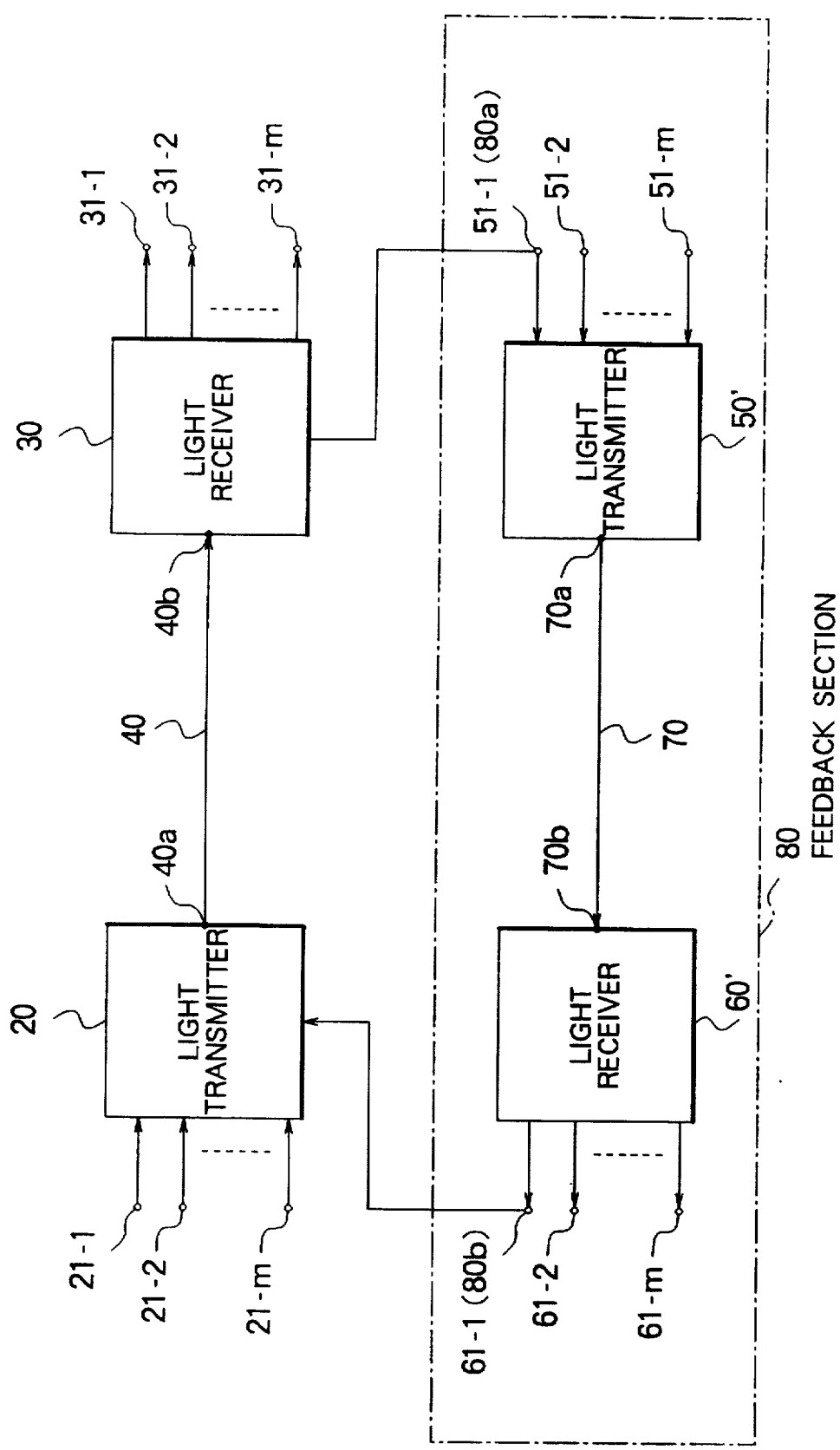
FIG. 9 is a block diagram of a feedback section for use in the wavelength division multiplexing transmission system illustrated in FIG. 5.

Referring to FIG. 9, the feedback section 80 comprises the downward light transmitter 50', the downward light receiver 60', and the downward optical transmission path 70. In the example being illustrated, the upward output light power level signal is supplied with the first downward input terminal 51-1 of the downward light transmitter 50' that acts as the end 80a of the feedback section 80 while the upward received light power level signal is produced by the first downward output terminal 61-1 of the downward light receiver 60' that serves as the other end 80b of the feedback section 80. The upward output light power level signal may be supplied with any one of the first through the m-th downward input terminals 51-1 to 51-m of the downward light transmitter 50' while the upward received light light power level signal may be produced by a corresponding one of the first through the m-th downward output terminals 61-1 to 61-m of the downward light receiver 60'.

The downward optical transmission path 70 is operable as a feedback optical transmission path for connecting the downward light transmitter 50' and the downward light receiver 60'. The downward light transmitter 50' converts the upward output light power level signal into a downward output light power level light signal to send the downward output light power level light signal to the end 70a of the feedback optical transmission path 70. The feedback optical transmission path 70 transmits the downward output light power level light signal as a downward transmission light power level light signal from the downward light transmitter 50' to the downward light receiver 60'. The downward light receiver 60' receives the downward transmission light power level light signal as a downward received light power level light signal at the other end 70b of the feedback optical transmission path 70 to convert the downward received light power level light signal into the upward received light light power level signal.

Figure 10:
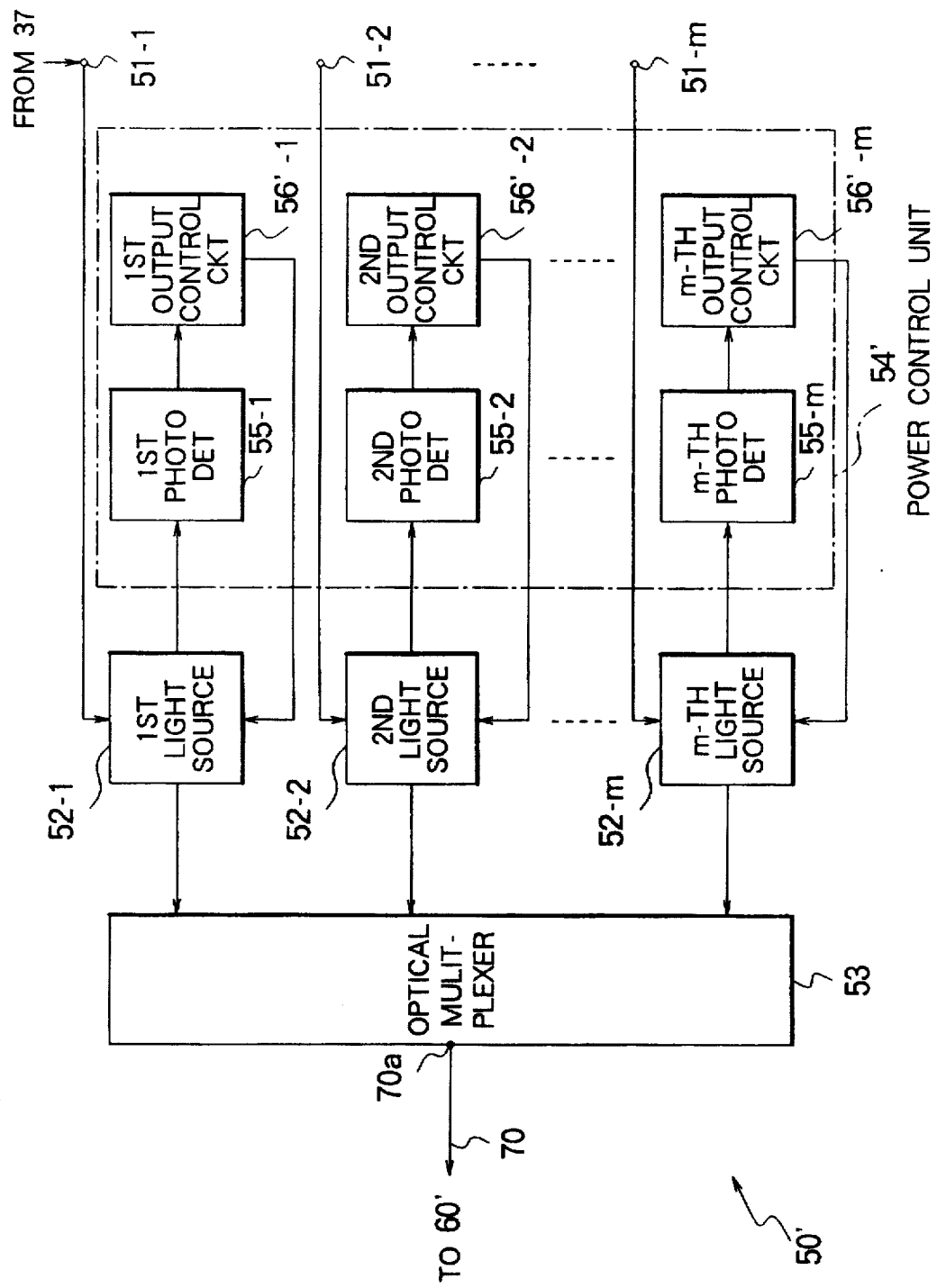
FIG. 10 is a block diagram of a light transmitter for use in the feedback section illustrated in FIG. 9.

Turning to FIG. 10, the downward light transmitter 50' is similar in structure to the upward light transmitter 20' as mentioned above. More specifically, the downward light transmitter 50' comprises first through m-th downward light sources 52-1, 52-2, . . . , and 52-m, a downward optical multiplexer 53, and an downward power control unit 54'. The first through m-th downward light sources 52-1 to 52-m are connected to the first through the m-th downward input terminals 51-1 to 51-m, respectively. Each of the first through m-th downward light sources 52-1 to 52-m may be a laser diode. The first downward input terminal 51-1 is supplied with, as the first downward input data signal, the upward output light power level signal from the upward encoding circuit 37 (FIG. 6).

Responsive to the first through the m-th downward input data signals, the first through the m-th downward light sources 52-1 to 52-m emit first through m-th downward original light signals with first through m-th downward controllable original light power levels, respectively, along a forward direction which is a left-hand direction in FIG. 10. Connected to the upward encoding circuit 37, the first downward light sources 52-1 serves as an additional light source for emitting, in response to the upward output light power level signal, the downward output light power level light signal corresponding to the upward output light power level signal. The first through the m-th downward original light signals have the first through the m-th wavelengths $\lambda_1$ to $\lambda_m$, respectively. The first through the m-th downward original light signals are supplied to the downward optical multiplexer 53. The first through the m-th downward light sources 52-1 to 52-m further emit first through m-th backward light signals, respectively, in a backward direction which is a right-hand direction in FIG. 10. The first through the m-th backward light signals are supplied to the downward power control unit 54'.

The downward optical multiplexer 53 is connected to the first through the m-th downward light sources 52-1 to 52-m and to the end 70a of the downward or feedback optical transmission path 70. The downward optical multiplexer 53 may be a wavelength multiplexing coupler, a fiber coupler, or the like. The downward optical multiplexer 53 multiplexes the first through the m-th downward original light signals into the downward multiplexed light signal. The downward multiplexed light signal is sent to the end 70a of the downward optical transmission path 70. That is, the downward optical multiplexer 53 acts as a supplying arrangement for supplying the downward output light power level light signal to the feedback optical transmission path 70. In the example being illustrated, the downward transmission light power level light signal is transmitted using the first channel #1 of the downward multiplexed light signal via the feedback optical transmission path 70.

Inasmuch as the transmission characteristics of the downward optical transmission path 70 are dependent on wavelength, the first through the m-th downward light sources 52-1 to 52-m is controlled by the downward power control unit 54'. More specifically, the downward optical transmission path 70 comprises generally an optical fiber, a plurality of optical amplifiers, or the like. As a result, the downward optical transmission path 70 has a gain/loss characteristic which is different from each wavelength.

The downward power control unit 54' comprises first through m-th downward photo detectors 55-1, 55-2, . . . , and 55-m and first through m-th downward output control circuits 56'-1, 56'-2, . . . , and 56'-m.

The first through the m-th downward photo detectors 55-1 to 55-m are connected to the first through the m-th downward light sources 52-1 to 52-m, respectively. Each of the first through the m-th downward photo detectors 55-1 to 55-m may be a photodiode. The first through the m-th downward photo detectors 55-1 to 55-m detects the first the m-th downward controllable original light power levels in the first through the m-th backward light signals to produce first through m-th downward detected light power level signals indicative of the first the m-th downward controllable original light power levels, respectively. The first through the m-th downward detected light power level signals are supplied to the first through the m-th downward output control circuits 56'-1 to 56'-m, respectively.

The first through the m-th downward output control circuits 56'-1 to 56'-m are connected to the first through the m-th downward photo detectors 55-1 to 55-m and to the first through the m-th downward light sources 52-1 to 52-m, respectively. The first through the m-th downward output control circuits 56'-1 to 56'-m are preliminarily set first through m-th downward output levels for the first through the m-th downward light sources 52-1 to 52-m with the wavelength dependent characteristics in the downward optical transmission path 70 taken into account. Responsive to the first through the m-th downward detected light power level signals, the first through the m-th downward output control circuits 56'-1 to 56'-m control the first through the m-th downward light sources 52-1 to 52-m so as to maintain the first through the m-th downward output levels at the first through the m-th downward output levels, respectively.

Figure 11:
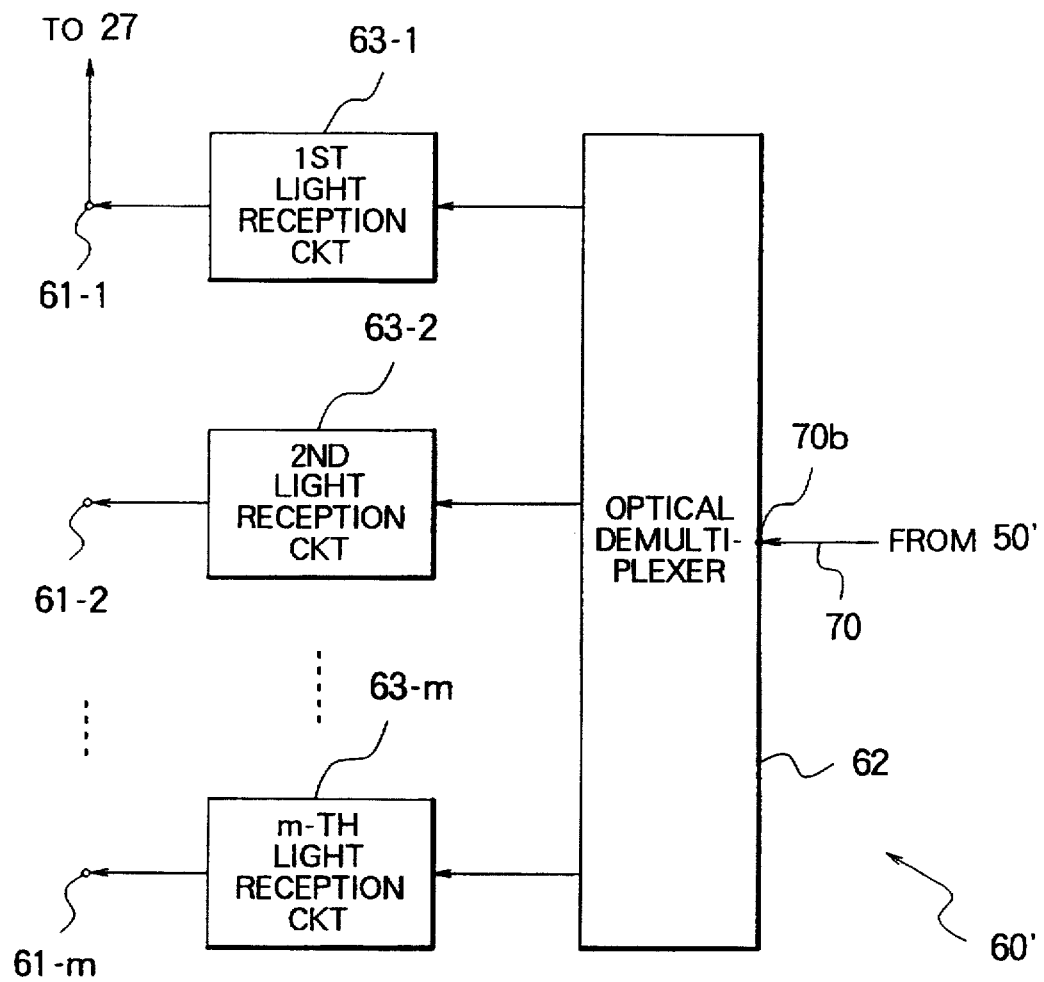
FIG. 11 is a block diagram of a light receiver for use in the feedback section illustrated in FIG. 9.

Turning to FIG. 11, the downward light receiver 60' is similar in structure to the upward light receiver 30' as mentioned above. More specifically, the downward light receiver 60' comprises a downward optical demultiplexer 62 and first through m-th downward light reception units 63-1, 63-2, . . . , and 63-m. The downward optical demultiplexer 62 is connected to the other end 70b of the downward or feedback optical transmission path 70. The downward optical demultiplexer 62 demultiplexes the downward received light signal into first through m-th downward demultiplexed light signals, respectively. The downward optical demultiplexer 62 acts as an extracting arrangement for extracting the downward transmission light power level light signal from the feedback optical transmission path 70 to produce the downward received light power level light signal. In the example being illustrated, the first downward demultiplexed light signal for the first channel #1 is produced as the downward received light power level light signal. The first through the m-th downward demultiplexed light signals have first through m-th downward received light power levels, respectively. The first through the m-th downward demultiplexed light signals are supplied to the first through the m-th downward light reception units 63-1 to 63-m, respectively.

The first through the m-th downward light reception units 63-1 to 63-m are connected to the downward optical demultiplexer 62 in common and to the first through the m-th downward output terminals 61-1 to 61-m, respectively. The first through the m-th downward light reception units 63-1 to 63-m receive the first through the m-th downward demultiplexed light signals to convert the first through the m-th downward demultiplexed light signals into the the first through the m-th downward output data signals which are outputted by the first through the m-th downward output terminals 61-1 to 61-m, respectively. The first downward output terminal 61-1 produces the first downward output data signal as the upward received light power level signal which is supplied to the upward decoding circuit 27 (FIGS. 7 and 8). At any rate, the downward light reception unit 63-1 for the first channel #1 is operable as an additional light reception unit for converting the downward received light power level light signal into the upward received light power level signal.

Figure 12:
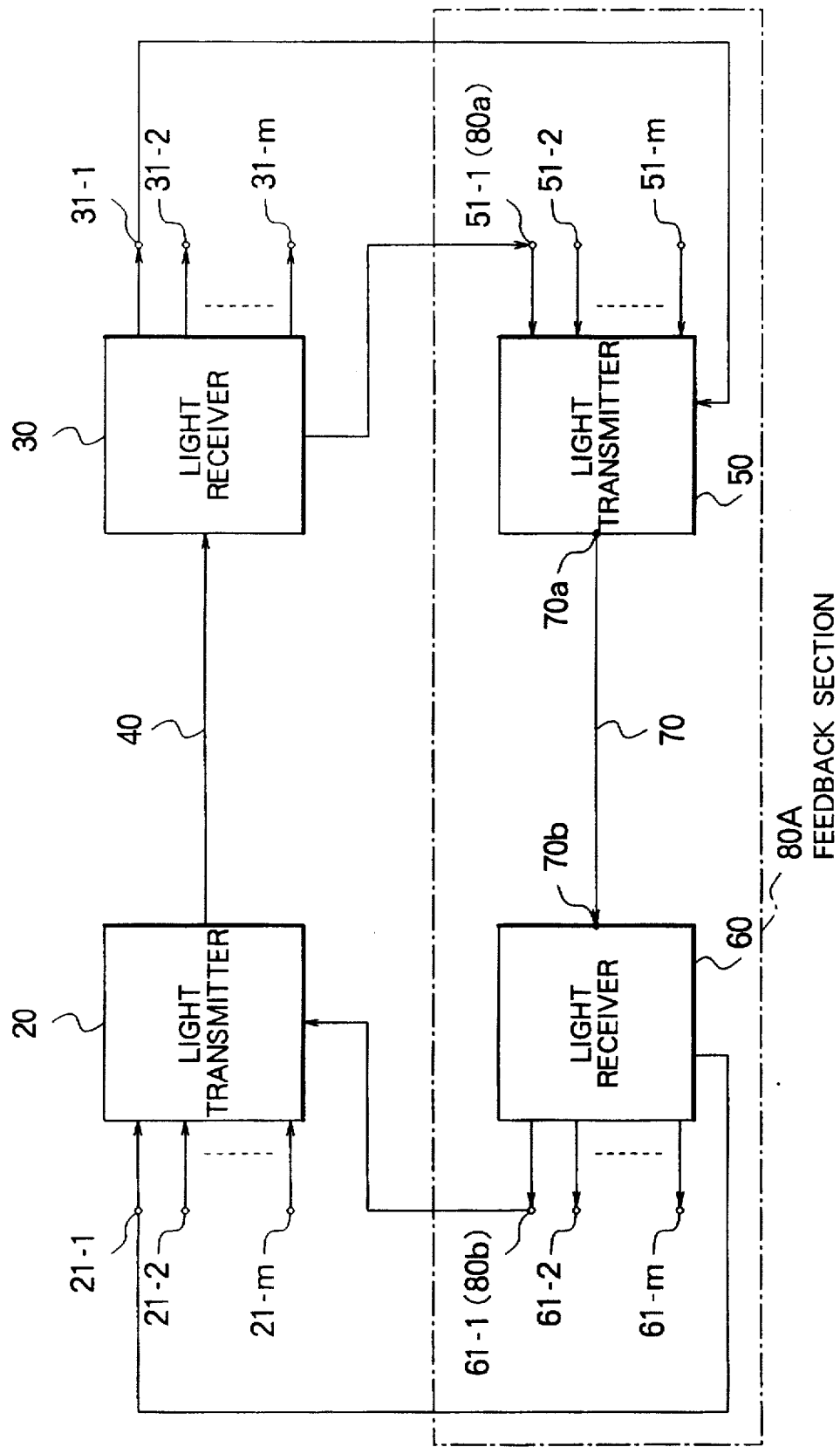
FIG. 12 is a block diagram of another feedback section for use in the wavelength division multiplexing transmission system illustrated in FIG. 5.

Referring to FIG. 12, another feedback section 80A comprises a downward light transmitter 50, a downward light receiver 60, and the downward or feedback optical transmission path 70. In the example being illustrated, the upward output light power level signal is supplied with the first downward input terminal 51-1 of the downward light transmitter 50 that acts as the end 80a of the feedback section 80A while the upward received light light power level signal is produced by the first downward output terminal 61-1 of the downward light receiver 60 that serves as the other end 80b of the feedback section 80A.

The downward light transmitter 50 converts the upward output light power level signal into the downward output light power level light signal to send the downward output light power level light signal to the end 70a of the feedback optical transmission path 70. The downward optical transmission path 70 transmits the downward output light power level light signal as the downward transmission light power level light signal from the downward light transmitter 50 to the downward light receiver 60. The downward light receiver 60 receives the downward transmission light power level light signal as the downward received light power level light signal to convert the downward received light power level light signal into the upward received light power level signal.

In addition, a downward output light power level signal is supplied with the first upward input terminal 21-1 of the upward light receiver 20 while a downward received light power level signal is produced by the first downward output terminal 31-1 of the upward light receiver 30. That is, a combination of the upward light transmitter 20, the upward light receiver 30, and the upward optical transmission path 40 also acts as a different feedback section.

Similarly, the upward light transmitter 20 converts the downward output light power level signal into the upward output light power level light signal to send the upward output light power level light signal to the end 40a of the upward optical transmission path 40. The upward optical transmission path 40 transmits the upward output light power level light signal as the upward transmission light power level light signal from the upward light transmitter 20 to the upward light receiver 30. The upward light receiver 30 receives the upward transmission light power level light signal as the upward received light power level light signal to convert the upward received light power level light signal into the downward received light power level signal.

Figure 13:
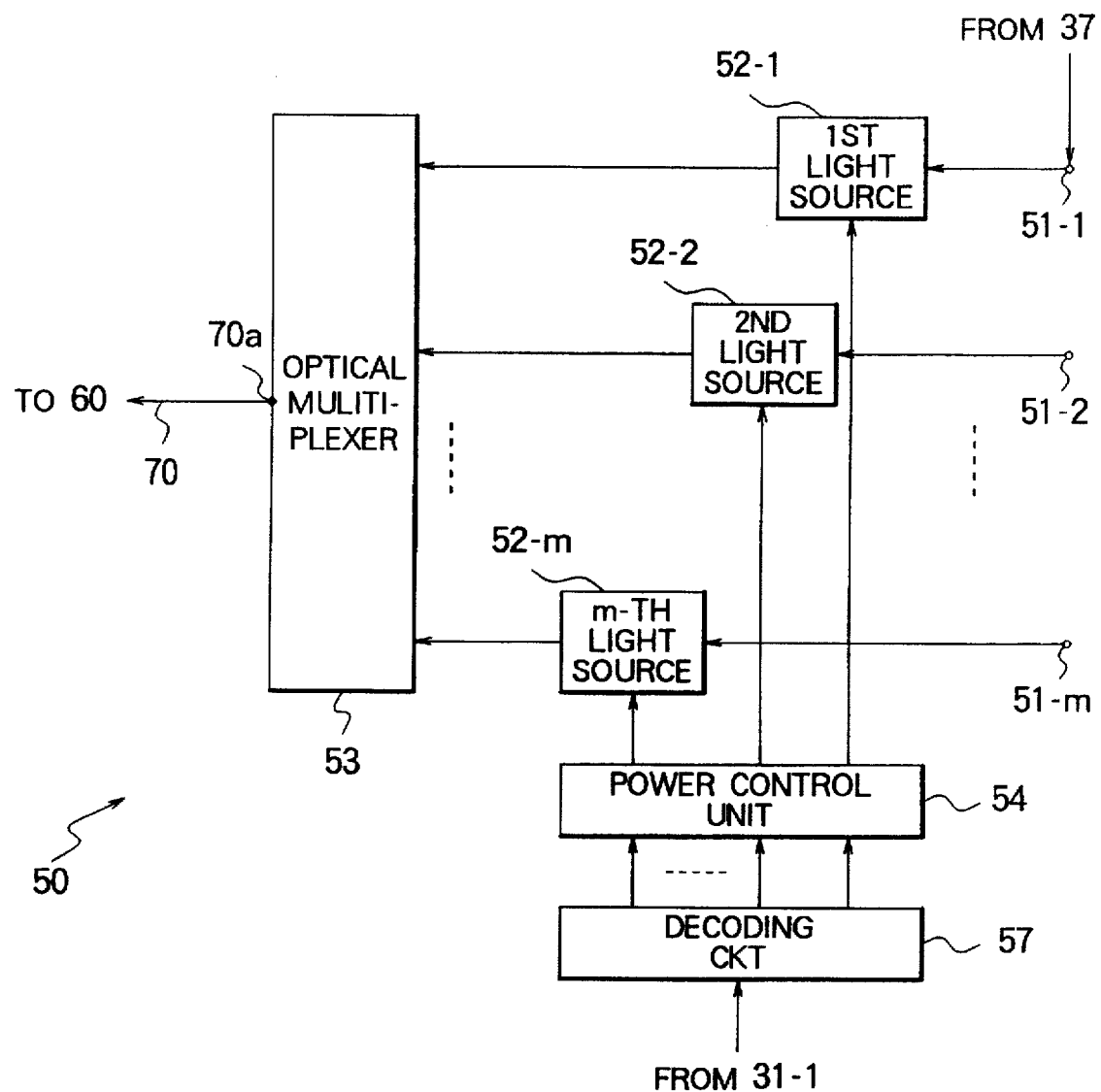
FIG. 13 is a block diagram of a light transmitter for use in the feedback section illustrated in FIG. 12.

Turning to FIG. 13, the downward light transmitter 50 is similar in structure to the upward light transmitter 20 illustrated in FIG. 7. More specifically, the downward light transmitter 50 comprises the first through the m-th downward light sources 52-1 to 52-m, the downward optical multiplexer 53, a downward power control unit 54, and a downward decoding circuit 57.

The first through the m-th downward light sources 52-1 to 52-m are supplied with the first through the m-th downward input data signals from the first through the m-th downward input terminals 51-1 to 51-m, respectively. The first downward input terminal 51-1 is supplied with, as the first downward input data signal, the upward output light power level signal from the upward encoding circuit 37 (FIG. 6).

Responsive to the first through the m-th downward input data signals, the first through the m-th downward light sources 52-1 to 52-m emit the first through the m-th downward original light signals with the first through the m-th downward controllable original light power levels, respectively. Connected to the upward encoding circuit 37, the first downward light sources 52-1 serves as the additional light source for emitting, in response to the upward output light power level signal, the downward output light power level light signal corresponding to the upward output light power level signal. The first through the m-th downward original light signals have the first through the m-th wavelengths $\lambda_1$ to $\lambda_m$, respectively. The first through the m-th downward original light signals are supplied to the downward optical multiplexer 53. The downward optical multiplexer 53 multiplexes the first through the m-th downward original light signals into the downward multiplexed light signal which is sent to the end 70a of the downward optical transmission path 70. That is, the downward optical multiplexer 53 acts as the supplying arrangement for supplying the downward output light power level light signal to the downward optical transmission path 70. The downward transmission light power level light signal is transmitted using the first channel #1 of the downward multiplexed light signal via the downward optical transmission path 70.

The downward decoding circuit 57 is connected to the upward output terminal 31-1 of the upward light receiver 30 (FIG. 12). The downward decoding circuit 57 acts as a downward power level inputting arrangement for inputting an upward transmission light power level signal from the the upward light receiver 30 as a downward received light power level signal to produce first through m-th downward input light power level signals as replicas of the first through the m-th downward detected light power level signals. In other words, the downward decoding circuit 57 decodes the downward received light power level signal into first through m-th downward decoded light power level signals. The downward decoding circuit 57 produces the first through m-th downward decoded light power level signals as the first through m-th downward input light power level signals. The first through m-th downward input light power level signals are supplied to the downward power control unit 54.

The downward power control unit 54 is connected to the downward decoding circuit 57 and to the first through the m-th downward light sources 52-1 to 52-m. Responsive to the first through m-th downward input light power level signals, the downward power control unit 54 controls the first through the m-th downward light sources 52-1 to 52-m to change the first through the m-th downward controllable original light power levels of the first through the m-th downward original light signals so that the first through the m-th downward demultiplexed light signals have the first through the m-th downward received light power levels each of which becomes the predetermined light power level.

The downward light transmitter 50 may be modified into another downward light transmitter which is similar in structure to the upward light transmitter 20A illustrated in FIG. 8.

Figure 14:
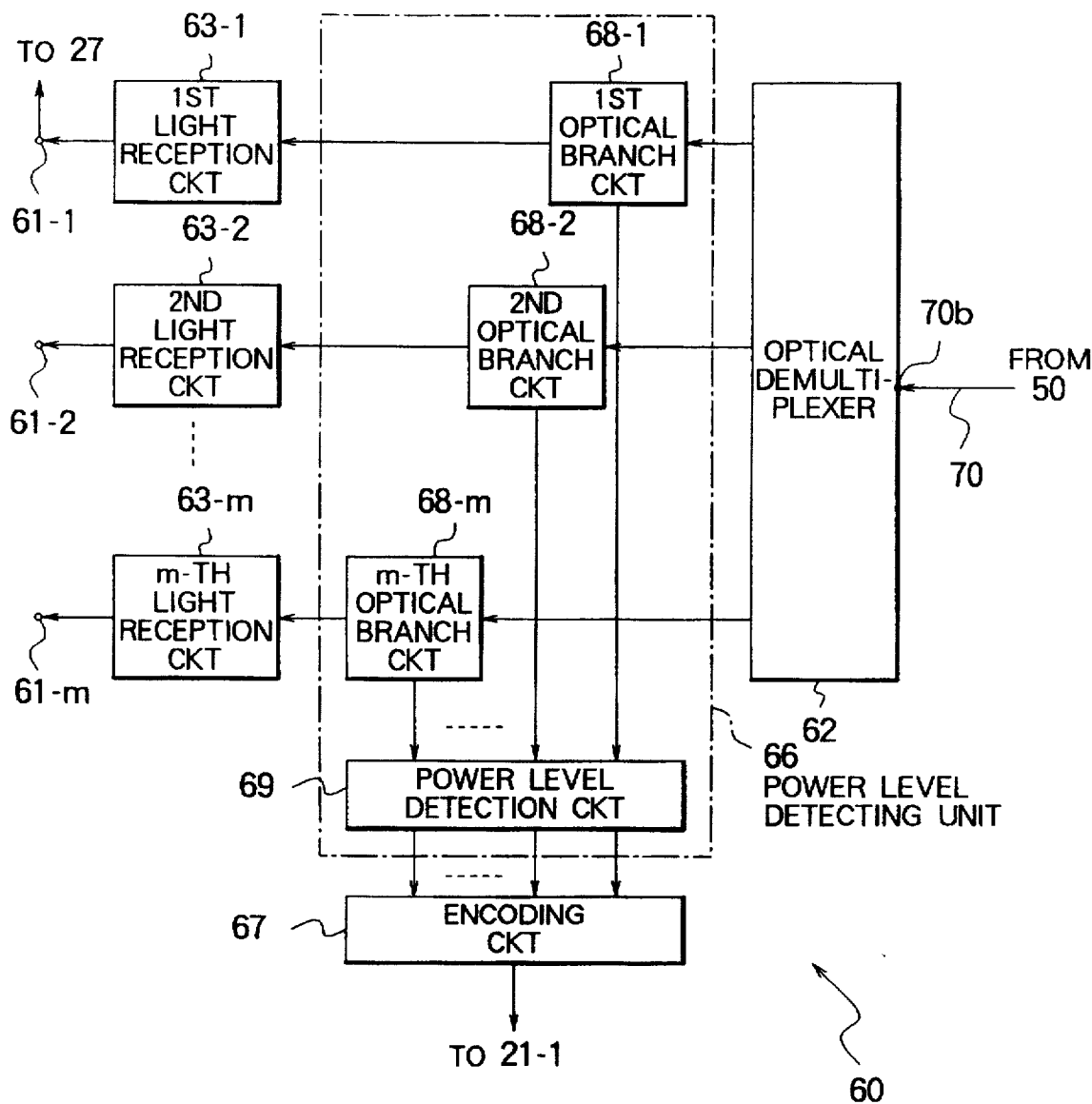
FIG. 14 is a block diagram of a light receiver for use in the feedback section illustrated in FIG. 12.

Turning to FIG. 14, the downward light receiver 60 is similar in structure to the upward light receiver 30 illustrated in FIG. 6. More specifically, the downward light receiver 60 comprises the downward optical demultiplexer 62, the first through the m-th downward light reception units 63-1 to 63-m, a downward power level detecting unit 66, and a downward encoding circuit 67.

The downward optical demultiplexer 62 is connected to the other end 70b of the downward optical transmission path 70. The downward optical demultiplexer 62 demultiplexes the downward received light signal into the first through the m-th downward demultiplexed light signals which have first through m-th downward received light power levels, respectively. The downward optical demultiplexer 62 acts as the extracting arrangement for extracting the downward transmission light power level light signal from the downward optical transmission path 70 to produce the downward received light power level light signal. In the example being illustrated, the first downward demultiplexed light signal is produced as the downward received light power level light signal. The first through the m-th downward demultiplexed signals are supplied to the downward power level detecting unit 66.

The downward power level detecting unit 66 is connected to the downward optical demultiplexer 62. The downward power level detecting unit 66 detects the first through the m-th downward received light levels of the first through the m-th downward demultiplexed light signals to produce first through m-th downward detected light power level signals indicative of the first through the m-th downward received light power levels, respectively. More specifically, the downward power level detecting unit 66 comprises first through m-th downward optical branch circuits 68-1, 68-2, ..., and 68-m and a downward power level detection circuit 69. The first through the m-th downward optical branch circuits 68-1 to 68-m are connected to the downward optical demultiplexer 62 in common and to the first through the m-th downward light reception units 63-1 to 63-m, respectively. The first through the m-th downward optical branch circuits 68-1 to 68-m branches the first through the m-th downward demultiplexed light signals to produce first through m-th downward branched light signals, respectively. The first through m-th downward branched light signals are supplied to the downward power level detection circuit 69. The downward power level detection circuit 69 is connected to the first through the m-th downward optical branch circuits 68-1 to 68-m and to the downward encoding circuit 67. The downward power level detection circuit 69 detects the first through the m-th downward received light power levels in the first through the m-th downward branched light signals to produce the first through the m-th downward detected light power level signals.

The downward encoding circuit 67 is connected to the downward power level detecting unit 66 and to the first upward input terminal 21-1 of the upward light transmitter 20 (FIG. 12). The downward encoding circuit 67 encodes the first through the m-th downward detected light power level signals into a downward encoded light power level signal. At any rate, the downward encoding circuit 67 serves as an downward power level outputting arrangement for outputting, in response to the first through the m-th downward detected light power level signals, a downward output light power level signal corresponding to the first through the m-th downward detected light power level signals to the first upward input terminal 21-1 of the upward light transmitter 20. The downward encoding circuit 67 produces the downward encoded light power level signal as the downward output light power level signal. As a result, the feedback section, which comprises the combination of the upward light transmitter 20, the upward optical transmission path 40, and the upward light receiver 30 transmits the downward output light power level signal as an upward transmission light power level signal from the downward light receiver 60 to the downward light transmitter 50.

In addition, the first through the m-th downward light reception units 63-1 to 63-m are connected to the downward optical demultiplexer 62 via the downward power level detecting unit 66 in common and to the first through the m-th downward output terminals 61-1 to 61-m, respectively. The first through the m-th downward light reception units 63-1 to 63-m receives the first through the m-th downward demultiplexed light signals to convert the first through the m-th downward demultiplexed light signals into the first through the m-th downward output data signals which are outputted by the first through the m-th downward output terminals 61-1 to 61-m, respectively. The first downward output terminal 61-1 produces the first downward output data signal as the upward received light power level signal which is supplied to the upward decoding circuit 27 (FIGS. 7 and 8). At any rate, the first downward light reception unit 63-1 is operable as the additional light reception unit for converting the downward received light power level light signal into the upward received light power level signal.

Figure 15:
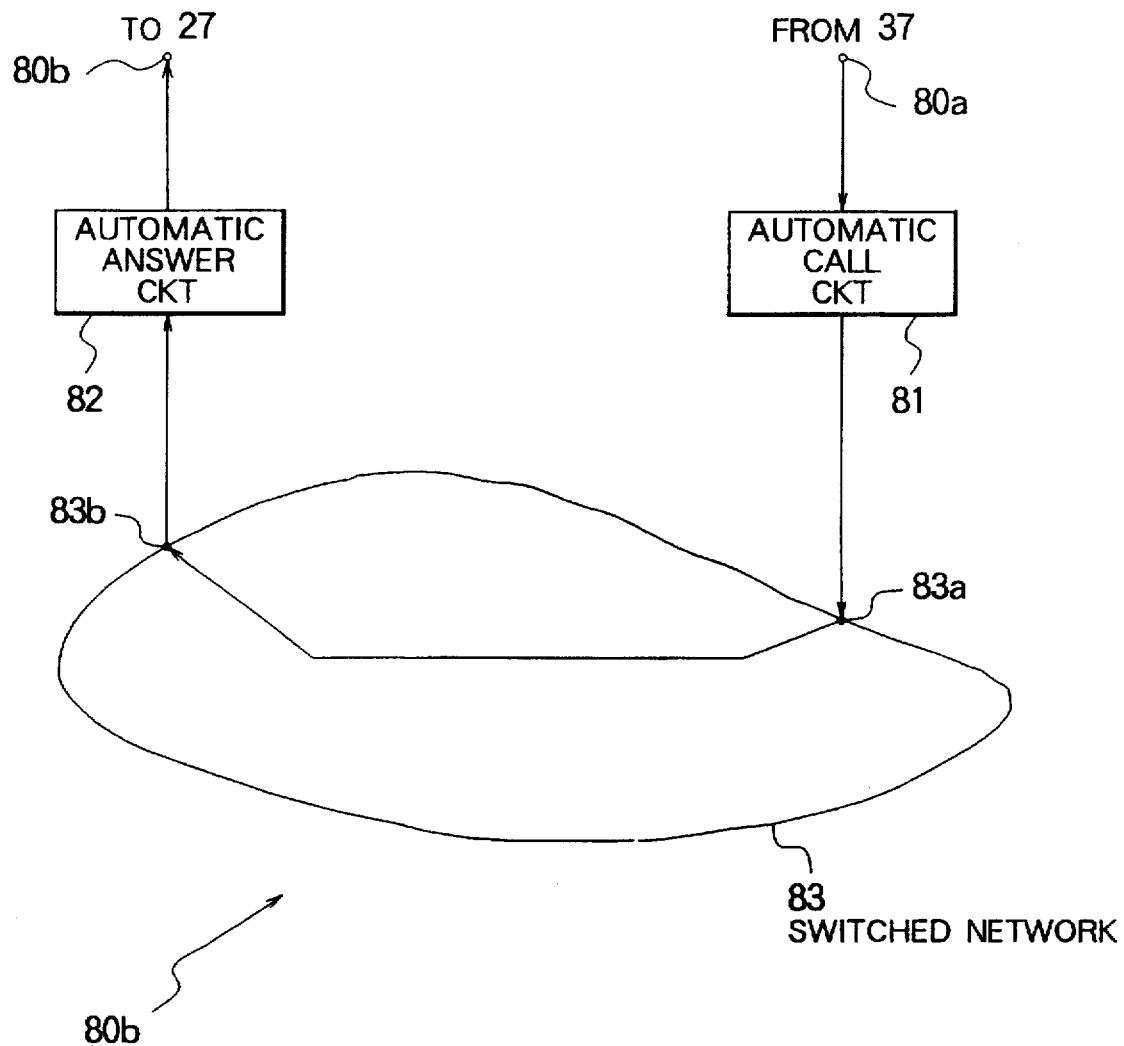
FIG. 15 is a block diagram of still another feedback section for use in the wavelength division multiplexing transmission system illustrated in FIG. 5.

Referring to FIG. 15, still another feedback section 80B comprises an automatic call circuit 81 of the second side B, an automatic answer circuit 82 of the first side A, and a switched network 83. The automatic call circuit 81 is connected to the upward encoding circuit 37 (FIG. 6) of the upward light receiver 30 and to an end 83a of the switched network 83. The automatic answer circuit 82 is connected to the upward decoding circuit 27 (FIGS. 7 and 8) of the upward light transmitter 20 and to the other end 83b of the switched network 83. The switched network 83 connects the automatic call circuit 81 and the automatic answer circuit 82.

The automatic call circuit 81 holds a destination address indicative of the upward light transmitter 20. When the automatic call circuit 81 is supplied with the output light power level signal from the upward encoding circuit 37, the automatic call circuit 81 automatically makes a call for the upward light transmitter 20 on the basis of the destination address to send a call message including the downward transmission light power level signal to the automatic answer circuit 82 via the switched network 83. The automatic answer circuit 82 automatically answers the call by the automatic call circuit 81 to receive the call message. The automatic answer circuit 82 produces the upward received light power level signal included in the call message.

Figure 16A:
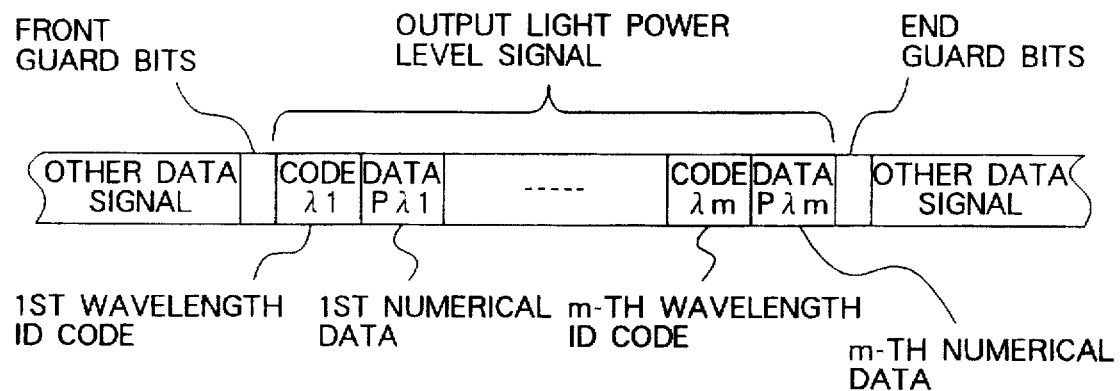
FIGS. 16(A) to 16(C) are signal formats for use in the light receiver illustrated in FIG. 6.
Figure 16B:
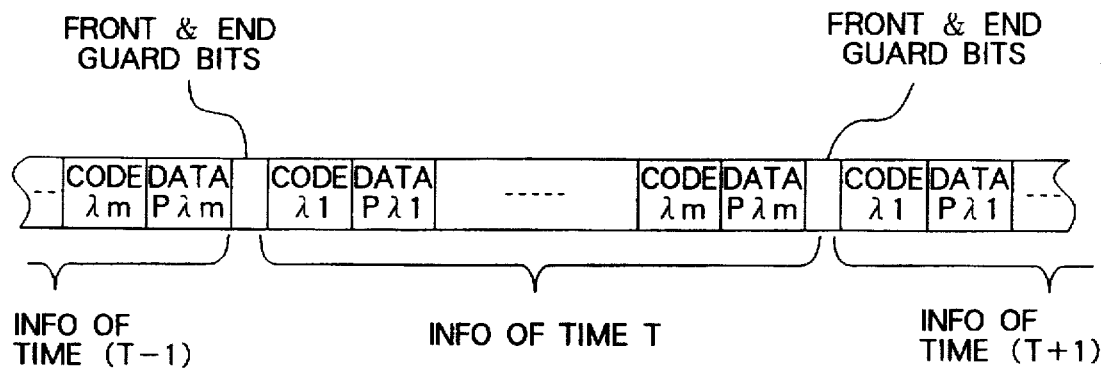
Figure 16C:
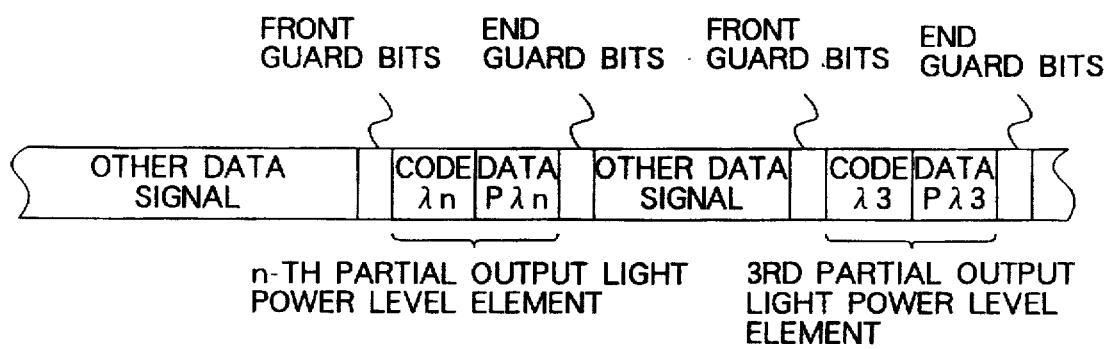

Turning to FIGS. 16(A) to 16(C), the upward light receiver 30 is operable in any one of three modes, namely, a periodic mode, a cyclic mode, and an irregular mode.

In the periodic mode, the upward encoding circuit 37 outputs the upward output light power level signal periodically. In this event, the output light power level signal has a signal format as shown in FIG. 16(A). The output light power level signal is put between front guard bits and end guard bits. Each of the front guard bits and the end guard bits represent a predetermined code for partitioning a signal into the output light power level signal and other data signals. The output light power level signal consists of first through m-th wavelength identification codes (depicted at Code $\lambda_1$ to Code $\lambda_m$) for identifying the first through the m-th wavelengths $\lambda_1$ to $\lambda_m$ and first through m-th numerical data (depicted at Data P$\lambda_1$ to Date P$\lambda_m$) which indicate the first through the fourth received light power levels and which are followed by the first through the m-th wavelength identification codes, respectively.

In the cyclic mode, the output light power level signal comprises first through m-th partial output light power level elements which indicate the first through the m-th received light power levels, respectively. The upward encoding circuit 37 cyclically outputs the first through the m-th partial output light power level elements in an ascending order as shown in FIG. 16(B). The first through the m-th partial output light power level elements consist of the first through the m-th numerical data Data P$\lambda_1$ to Date P$\lambda_m$ and the first through the m-th wavelength identification codes Code $\lambda_1$ to Code $\lambda_m$ following the first through the m-th numerical data Data P$\lambda_1$ to Date P$\lambda_m$, respectively. A packet consisting of the first through the m-th partial output light power level elements is put between front and end guard bits.

In the irregular mode, the upward power level detecting unit 36 determines whether or not each of the first through the m-th received light power levels changes in excess of a predetermined range. It is assumed that an n-th upward received light power level changes in excess of the predetermined range where n is a variable between one and the positive integer m, both inclusive. In this event, the upward power level detecting unit 36 produces not only an n-th upward detected light power level signal indicative of the n-th upward received light power level but also a detection signal accompanied with an n-th wavelength identification codes Code $\lambda_n$. Responsive to the detection signal, the upward encoding circuit 37 produces an n-th partial output light power level element which consists of an n-th numerical data Data P$\lambda_n$ and the n-th wavelength identification code Code $\lambda_n$ following the n-th numerical data Data P$\lambda_n$, as shown in FIG. 16(C), and which is put between the front guard bits and the end guard bits.

While this invention has thus far been described in conjunction with a few preferred embodiments thereof, it will readily be possible for those skilled in the art to put this invention into practice in various other manners. For example, each of the light sources may be a light emitting diode (LED). In addition, each of the light reception units may be an avalanche photodiode.

What is claimed is:

1. A wavelength division multiplexing transmission system comprising a light transmitter of a first side, a light receiver of a second side opposite to the first side, and an optical transmission path for connecting said light transmitter of the first side and said light receiver of the second side, said optical transmission path having transmission characteristics dependent on wavelength, said light transmitter of the first side comprising:
first through m-th light sources for emitting first through m-th original light signals with first through m-th controllable original light power levels, respectively, where m represents a positive integer which is not less than two, the first through m-th original light signals having first through m-th wavelengths, respectively, which are different from each other; and
an optical multiplexer, connected to said first through said m-th light sources and to an end of said optical transmission path, for multiplexing the first through the m-th original light signals into a multiplexed light signal;
said optical transmission path transmitting the multiplexed light signal as a transmission light signal from said light transmitter of the first side to said light receiver of the second side,
said light receiver of the second side being for receiving the transmission light signal as a received light signal and comprising:
an optical demultiplexer, connected to the other end of said optical transmission path, for demultiplexing the received light signal into first through m-th demultiplexed light signals as replicas of the first through the m-th original light signals, respectively, the first through the m-th demultiplexed light signals having first through m-th received light power levels, respectively; and first through m-th light reception units, connected to said optical demultiplexer, for receiving the first through the m-th demultiplexed light signals, respectively, said wavelength division multiplexing transmission system further comprising feedback means for connecting said light receiver of the second side and said light transmitter of the first side, said light receiver of the second side further comprising:

power level detecting means, connected to said optical demultiplexer, for detecting the first through the m-th received light power levels of the first through the m-th demultiplexed light signals to produce first through m-th detected light power level signals indicative of the first through the m-th received light power levels; and power level outputting means, connected to said power level detecting means and to an end of said feedback means, for outputting, in response to the first through the m-th detected light power level signals, an output light power level signal corresponding to the first through the m-th detected light power level signals to the end of the said feedback means, thereby making said feedback means transmit the output light power level signal as a transmission light power level signal from said light receiver of the second side to said light transmitter of the first side, said light transmitter of the first side further comprising:

power level inputting means, connected to the other end of said feedback means, for inputting the transmission light power level signal from said feedback means as a received light power level signal to produce first through m-th input light power level signals as replicas of the first through the m-th detected light power level signals; and power control means, connected to said power level inputting means and said first through said m-th light sources, for controlling, in response to the first through the m-th input light power level signals, said first through said m-th light sources to change the first through the m-th controllable original light power levels of the first through the m-th original light signals so that the first through the m-th demultiplexed light signals have the first through the m-th received light power levels each of which becomes a predetermined light power light.

2. A wavelength division multiplexing transmission system as claimed in claim 1, wherein said power level detecting means comprises:

first through m-th optical branch circuits, connected to said optical demultiplexer in common and to said first through said m-th light reception units, respectively, for branching the first through the m-th demultiplexed light signals to produce first through m-th branched light signals, respectively; and a power level detection circuit, connected to said first through said m-th optical branch circuits and to said power level outputting means, for detecting the first through the m-th received light power levels in the first through the m-th branched light signals to produce the first through the m-th detected light power level signals.

3. A wavelength division multiplexing transmission system as claimed in claim 1, wherein said power level outputting means is an encoding circuit, connected to said power level detecting means and to the end of said feedback means, for encoding the first through the m-th detected light power level signals into an encoded light power level signal, said encoding circuit producing the encoded light power level signal as the output light power level signal.

4. A wavelength division multiplexing transmission system as claimed in claim 1, wherein said power level inputting means is a decoding circuit, connected to the other end of said feedback means and to said power control means, for decoding the received light power level signal into first through m-th decoded light power level signals, said decoding circuit producing the first through the m-th decoded light power level signals as the first through the m-th input light power level signals.

5. A wavelength division multiplexing transmission system as claimed in claim 1, wherein said feedback means comprises a light transmitter of the second side connected to said light receiver of the second side, a light receiver of the first side connected to said light transmitter of the first side, and a feedback optical transmission path for connecting said light transmitter of the second side and the light receiver of the first side, said light transmitter of the second side converting the output light power level signal into an output light power level light signal to send the output light power level light signal to an end of the feedback optical transmission path, said feedback optical transmission path transmitting the output light power level light signal as a transmission light power level light signal from the light transmitter of the second side to said light receiver of the first side, said light receiver of the first side receiving the transmission light power level light signal as a received light power level light signal at the other end of said feedback optical transmission path to convert the received light power level light signal into the received light power level signal.

6. A wavelength division multiplexing transmission system as claimed in claim 5, wherein said light transmitter of the second side comprises:

an additional light source, connected to said power level output means, for emitting, in response the output light power level signal, the output light power level light signal corresponding to the output light power level signal; and supplying means, connected to said additional light source and to the end of said feedback optical transmission path, for supplying the output light power level light signal to the feedback optical transmission path;

said light receiver of the first side comprises:

extracting means, connected to the other end of said feedback optical transmission path, for extracting the transmission light power level light signal from said feedback optical transmission path to produce the received light power level light signal; and an additional light reception unit, connected to said extracting means and to said power level inputting means, for converting the received light power level light signal into the received light power level signal.

7. A wavelength division multiplexing transmission system as claimed in claim 6, wherein:

said supplying means is an additional optical multiplexer for multiplexing the output light power level light signal and other light signals into an additional multiplexed light signal, whereby the transmission light power level light signal is transmitted using one channel of the additional multiplexed light signal via said feedback optical transmission path;

said extracting means being an additional optical demultiplexer for demultiplexing the additional multiplexed light signal into a plurality of additional demultiplexed light signals, whereby one of the additional demultiplexed light signals corresponding to said one channel is produced as the received light power level light signal.

8. A wavelength division multiplexing transmission system as claimed in claim 1, wherein said feedback means comprises an automatic call circuit connected to said power level outputting means, an automatic answer circuit connected to said power level inputting means, and a switched network for connecting said automatic call circuit and said automatic answer circuit, said automatic call circuit holding a destination address indicative of said light transmitter of the first side and automatically making a call for said light transmitter of the first side on the basis of the destination address to send a call message including the transmission light power level signal to said automatic answer circuit via said switched network, said automatic answer circuit automatically answering the call by said automatic call circuit to receive the call message, said automatic answer circuit producing the received light power level signal included in the call message.

9. A wavelength division multiplexing transmission system as claimed in claim 1, wherein said power level outputting means outputs the output light power level signal periodically.

10. A wavelength division multiplexing transmission system as claimed in claim 1, wherein the output light power level signal comprises first through m-th partial output light power level elements which indicate the first through the m-th received light power levels, respectively, said power level outputting means cyclically outputs the first through the m-th partial output light power level elements in a predetermined order.

11. A wavelength division multiplexing transmission system as claimed in claim 1, wherein said power level detecting means determines whether or not each of the first through the m-th received light power levels changes in excess of a predetermined range, when one of the first through the m-th received light power levels changes in excess of the predetermined range, said power level detecting means producing not only one of the first through the m-th detected light power level signals that indicates said one of the first through the m-th received light power levels but also a detection signal accompanied with a particular code for identifying one of the first through the m-th wavelengthes that corresponds to said one of the first through the m-th received light power levels, said power level outputting means outputting, in response to the detection signal, the output light power level signal indicative of said one of the first through the m-th received light power levels accompanied with the particular code.

12. A light receiver for use in a wavelength division multiplexing transmission system comprising a light transmitter for transmitting, via an optical transmission path, a multiplexed light signal into which first through m-th original light signals with first through m-th controllable original light power levels are multiplexed, where m represents a positive integer which is not less than two, the first through the m-th original light signals having first through m-th wavelengths, respectively, which are different from each other, said optical transmission path having transmission characteristics dependent on wavelength and transmitting the multiplexed light signal as a transmission light signal from said light transmitter to said light receiver, said light receiver being for receiving the transmission light signal as a received light signal, said light receiver comprising:

an optical demultiplexer, connected to said optical transmission path, for demultiplexing the received light signal into first through m-th demultiplexed light signals as replicas of the first through the m-th original light signals, respectively, the first through the m-th demultiplexed light signals having first through m-th received light power levels, respectively;

first through m-th light reception units, connected to said optical demultiplexer, for receiving the first through the m-th demultiplexed light signals, respectively;

power level detecting means, connected to said optical demultiplexer, for detecting the first through the m-th received light power levels of the first through the m-th demultiplexed light signals to produce first through m-th detected light power level signals indicative of the first through the m-th received light power levels; and power level outputting means, connected to said power level detecting means and to an end of feedback means for connecting said light receiver and said light transmitter, for outputting, in response to the first through the m-th detected light power level signals, an output light level signal corresponding to the first through the m-th detected light power level signals to the end of said feedback means, thereby making said feedback means transmit the output light power level signal as a transmission light power level signal from said light receiver to said light transmitter.

13. A light receiver as claimed in claim 12, wherein said power level detecting means comprises:

first through m-th optical branch circuits, connected to said optical demultiplexer in common and to said first through said m-th light reception units, respectively, for branching the first through the m-th demultiplexed light signals to produce first through m-th branched light signals, respectively; and a power level detection circuit, connected to said first through said m-th optical branch circuits and to said power level outputting means, for detecting the first through the m-th received light power levels in the first through the m-th branched light signals to produce the first through the m-th detected light power level signals.

14. A light receiver as claimed in claim 12, wherein said power level outputting means is an encoding circuit, connected to said power detecting means and to the end of the feedback means, for encoding the first through the m-th detected light power level signals into an encoded light power level signal, said encoding circuit producing the encoded light power level signal as the output light power level signal.

15. A light receiver as claimed in claim 12, wherein said power level outputting means outputs the output light power level signal periodically.

16. A light receiver as claimed in claim 12, the output light power level signal comprising first through m-th partial output light power level elements which indicate the first through the m-th received light power levels, respectively, wherein said power level outputting means cyclically outputs the first through the m-th partial output light power level elements in a predetermined order.

17. A light receiver as claimed in claim 12, wherein said power level detecting means determines whether or not each of the first through the m-th received light power levels changes in excess of a predetermined range, when one of the first through the m-th received light power levels changes in excess of a predetermined range, said power level detecting means producing not only one of the first through the m-th detected light power level signals that indicates said one of the first through the m-th received light power levels but also a detection signal accompanied with a particular code for identifying one of the first through the m-th wavelengthes that corresponds to said one of the first through the m-th received light power levels, said power level outputting means outputting, in response to the detection signal, the output light power level signal indicative of said one of the first through the m-th received light power levels accompanied with the particular code.

18. A light transmitter for use in a wavelength division multiplexing transmission system, said light transmitter being for multiplexing first through m-th original light signals into a multiplexed light signal to transmit the multiplexed light signal to a light receiver of said wavelength division multiplexing transmission system via an optical transmission path having transmission characteristics dependent on wavelength, where m represents a positive integer which is not less than two, the first through the m-th original light signals having first through m-th wavelengths, respectively, which are different from each other, said optical transmission path being for transmitting the multiplexed light signal as a transmission light signal from said light transmitter to said light receiver, said light receiver being for receiving the transmission light signal as a received light signal to demultiplex the received light signal into first through m-th demultiplexed light signals as replicas of the first through the m-th original light signals, respectively, the first through the m-th demultiplexed light signals having first through m-th received light power levels, respectively, said light transmitter comprising:

first through m-th light sources for emitting the first through the m-th original light signals with first through m-th controllable original light power levels, respectively;

an optical multiplexer, connected to said first through said m-th light sources and to an end of said optical transmission path, for multiplexing the first through the m-th original light signals into the multiplexed light signal;

power level inputting means, connected to an end of feedback means for transmitting a transmission light power level signal from said light receiver from said light transmitter, for inputting the transmission light power level signal from said feedback means as a received light power level signal to produce first through m-th input light power level signals as replicas of first through m-th received light power level signals detected by said light receiver, the first through the m-th received light power level signals indicating the first through the m-th received light power levels of the first through the m-th demultiplexed light signals in said light receiver; and power control means, connected to said power level inputting means and to said first through said m-th light sources, for controlling, in response to the first through the m-th input light power level signals, said first through said m-th light sources to change the first through the m-th controllable original light power levels of the first through the m-th original light signals so that the first through the m-th demultiplexed light signals have the first through the m-th received light power levels each of which becomes a predetermined light power level.

19. A light transmitter as claimed in claim 18, wherein said power level inputting means is a decoding circuit, connected to the end of said feedback means and to said power control means, for decoding the received light power level signal into first through m-th decoded light power level signals, said decoding circuit producing the first through m-th decoded light power level signals as the first through the m-th input light power level signals.

* * * * *